United States Patent
Ukai et al.

(10) Patent No.: US 12,328,556 B2
(45) Date of Patent: Jun. 10, 2025

(54) SOUND PROCESSING METHOD, AND SOUND PROCESSING SYSTEM

(71) Applicant: YAMAHA CORPORATION, Hamamatsu (JP)

(72) Inventors: Satoshi Ukai, Hamamatsu (JP); Takamitsu Aoki, Hamamatsu (JP); Motoichi Tamura, Hamamatsu (JP); Shinya Koseki, Fukuroi (JP); Hideaki Takehisa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 305 days.

(21) Appl. No.: 18/193,713

(22) Filed: Mar. 31, 2023

(65) Prior Publication Data

US 2023/0262388 A1 Aug. 17, 2023

Related U.S. Application Data

(63) Continuation of application No. PCT/JP2021/035273, filed on Sep. 27, 2021.

(30) Foreign Application Priority Data

Oct. 2, 2020 (JP) .................. 2020-167568

(51) Int. Cl.
*H04R 3/02* (2006.01)
*G10L 21/0232* (2013.01)
(Continued)

(52) U.S. Cl.
CPC ............ *H04R 3/02* (2013.01); *G10L 21/0232* (2013.01); *G10L 25/51* (2013.01); *G10L 2021/02082* (2013.01); *H04R 2430/01* (2013.01)

(58) Field of Classification Search
None
See application file for complete search history.

(56) References Cited

U.S. PATENT DOCUMENTS 8,383,925 B2 * 2/2013 Uehara ................ G10H 1/0058
  381/151
9,633,671 B2 * 4/2017 Giacobello ......... G10L 21/0208
(Continued)

FOREIGN PATENT DOCUMENTS

JP 2008136080 A 6/2008
JP 2011176638 A 9/2011
(Continued)

OTHER PUBLICATIONS

International Search Report issued in Intl. Appln. No. PCT/JP2021/035273 mailed Dec. 21, 2021. English translation provided.
(Continued)

*Primary Examiner* — Paul W Huber
(74) *Attorney, Agent, or Firm* — ROSSI, KIMMS & McDOWELL LLP

(57) ABSTRACT

A sound processing method includes: receiving, using the communication device, from the remote apparatus, a first sound signal representing first sound generated by a user of the remote apparatus; emitting, using the sound emitting apparatus, the first sound represented by the first sound signal; receiving, using the sound receiving apparatus, sound that includes second sound generated by a user of the sound processing system; generating a second sound signal by sound processing, using processing parameters, a reception sound signal generated by the sound receiving apparatus; transmitting, using the communication device, the second
(Continued)

sound signal to the remote apparatus; updating the processing parameters based on the first sound signal or the reception sound signal; and stopping the updating of the processing parameters in a state where musical sound is included in at least one of the first sound or the second sound.

20 Claims, 11 Drawing Sheets

(51) Int. Cl.
*G10L 25/51* (2013.01)
*G10L 21/0208* (2013.01)

(56) References Cited

U.S. PATENT DOCUMENTS

| | | | |
|---|---|---|---|
| 11,404,073 B1* | 8/2022 | Zhang | G10L 21/0216 |
| 2008/0170712 A1 | 7/2008 | Somasundaram et al. | |
| 2012/0323583 A1 | 12/2012 | Miyasaka et al. | |
| 2016/0379514 A1 | 12/2016 | Matahira et al. | |
| 2018/0332174 A1 | 11/2018 | Kawai et al. | |

FOREIGN PATENT DOCUMENTS

| | | |
|---|---|---|
| JP | 2017163305 A | 9/2017 |
| WO | 2015105091 A1 | 7/2015 |

OTHER PUBLICATIONS

Written Opinion issued in Intl. Appln. No. PCT/JP2021/035273 mailed Dec. 21, 2021.

Office Action issued in Japanese Application No. 2020-167568 mailed Sep. 24, 2024. English translation provided.

English translation of Written Opinion issued in Intl. Appln. No. PCT/JP2021/035273 mailed Dec. 21, 2021, previously cited in IDS filed Mar. 31, 2023.

* cited by examiner

FIG. 7

| STATE | NEAR-END SOUND | FAR-END SOUND | SETTING SECTION 41 [Cn] | SETTING SECTION 42 [Q] | SETTING SECTION 43 [G] |
|---|---|---|---|---|---|
| A1 | SILENT | SILENT | STOP | STOP | STOP |
| A2 | SILENT | SPOKEN VOICE | STOP | UPDATE | STOP |
| A3 | SILENT | MUSICAL SOUND | UPDATE | STOP | STOP |
| A4 | SPOKEN VOICE | SILENT | STOP | STOP | UPDATE |
| A5 | SPOKEN VOICE | SPOKEN VOICE | STOP | STOP | STOP |
| A6 | SPOKEN VOICE | MUSICAL SOUND | STOP | STOP | STOP |
| A7 | MUSICAL SOUND | SILENT | STOP | STOP | STOP |
| A8 | MUSICAL SOUND | SPOKEN VOICE | STOP | STOP | STOP |
| A9 | MUSICAL SOUND | MUSICAL SOUND | STOP | STOP | STOP |

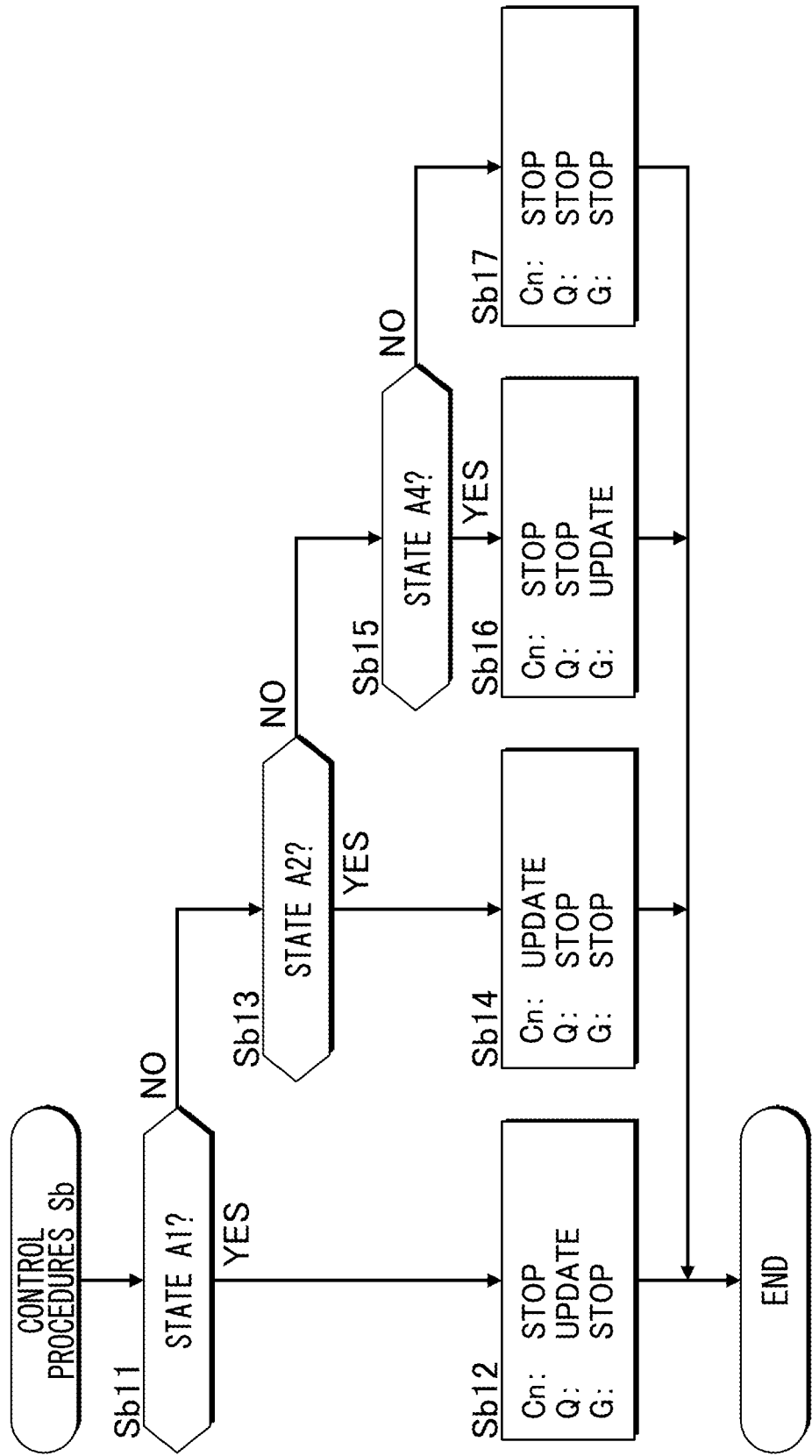

FIG. 11

| STATE | NEAR-END SOUND | FAR-END SOUND | 1st ANALYZER [θ1] | 2nd ANALYZER [θ2] | SETTING SECTION 42 [Q] | SETTING SECTION 43 [G] |
|---|---|---|---|---|---|---|
| B1 | SILENT | SILENT | STOP | STOP | STOP | STOP |
| B2 | SILENT | SPOKEN VOICE | UPDATE | STOP | STOP | STOP |
| B3 | SILENT | MUSICAL SOUND | STOP | STOP | STOP | STOP |
| B4 | SPOKEN VOICE | SILENT | STOP | UPDATE | STOP | UPDATE |
| B5 | SPOKEN VOICE | SPOKEN VOICE | STOP | STOP | STOP | STOP |
| B6 | SPOKEN VOICE | MUSICAL SOUND | STOP | STOP | STOP | STOP |
| B7 | MUSICAL SOUND | SILENT | STOP | STOP | STOP | STOP |
| B8 | MUSICAL SOUND | SPOKEN VOICE | STOP | STOP | STOP | STOP |
| B9 | MUSICAL SOUND | MUSICAL SOUND | STOP | STOP | STOP | STOP |

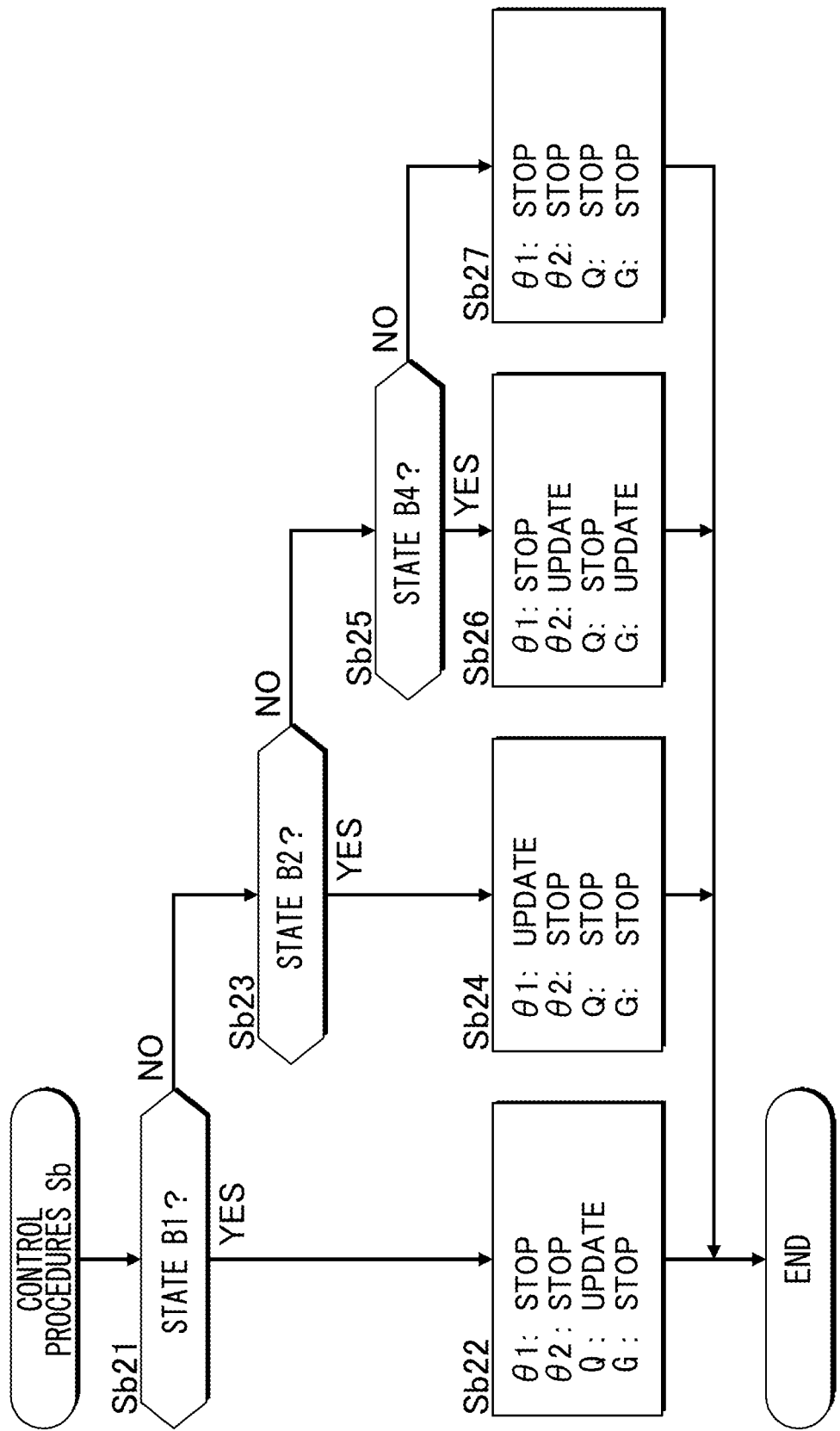

SOUND PROCESSING METHOD, AND SOUND PROCESSING SYSTEM

CROSS REFERENCE TO RELATED APPLICATIONS

This Application is a Continuation Application of PCT Application No. PCT/JP2021/035273 filed Sep. 27, 2021, and is based on and claims priority from Japanese Patent Application No. 2020-167568, filed Oct. 2, 2020, the entire contents of each of which are incorporated herein by reference.

BACKGROUND

Field of the Invention

The present disclosure relates to a technique for processing sound signals.

Description of Related Art

In an environment where communication devices communicate via a network and each of the communication devices includes a sound emitting device and a sound receiving device, an echo may be generated by a sound (return sound) emitted from the sound emitting device to the sound receiving device. For example, Japanese Patent Application Laid-Open Publication No. 2017-163305 discloses an echo reduction device, in which a pseudo echo signal that approximates a return sound is generated by an adaptive filter, and is subtracted from a reception sound signal generated by the sound receiving device. In such a technique, coefficients of the adaptive filter are updated when a far-end user is speaking. Otherwise, the coefficients are not updated.

In music sessions, plural users may use communication devices at locations remote from each other. Examples include a remote music lesson, in which by using communication equipment, a player of an instrument is instructed by an instructor present in a location remote from that of the player. Also envisaged is ensemble playing where each ensemble player collaborates from a respective remote location to collectively play a same piece of music. However, when a frequency response of the adaptive filter fluctuates due to update of the coefficients during the user's playing, musical expression of the player may be undesirably affected. Although description is given of update of the coefficients of the adaptive filter, the same problem may occur in other sound processing of the reception sound signal by the sound receiving device.

SUMMARY

In view of the circumstances described above, an object of one aspect of the present disclosure is to control a set of processing parameters used for processing a reception sound signal received by a sound-receiving device, in an environment in which a far-end sound received from a far-end device is emitted by a sound emitting device, and a near-end sound is generated by a near-end user.

To achieve the above-stated object, a sound processing method according to an aspect of this disclosure is a computer-implemented sound processing method between a remote apparatus and a sound processing system, which includes a communication device, a sound receiving apparatus, and a sound emitting apparatus, that communicate with each other via a network, the method including: receiving, using the communication device, from the remote apparatus, a first sound signal representing first sound generated by a user of the remote apparatus; emitting, using the sound emitting apparatus, the first sound represented by the first sound signal; receiving, using the sound receiving apparatus, sound that includes second sound generated by a user of the sound processing system; generating a second sound signal by sound processing, using processing parameters, a reception sound signal generated by the sound receiving apparatus; transmitting, using the communication device, the second sound signal to the remote apparatus; updating the processing parameters based on the first sound signal or the reception sound signal; and stopping the updating of the processing parameters in a state where musical sound is included in at least one of the first sound or the second sound.

A sound processing system according to another aspect of this disclosure is a computer-implemented sound processing method between a remote apparatus and a sound processing system, which includes a communication device, a sound receiving apparatus, and a sound emitting apparatus, that communicate with each other via a network, the method including: receiving, using the communication device, from the remote apparatus, a first sound signal representing first sound generated by a user of the remote apparatus; emitting, using the sound emitting apparatus, the first sound represented by the first sound signal; receiving, using the sound receiving apparatus, sound that includes second sound generated by a user of the sound processing system; generating a second sound signal by sound processing, using processing parameters, a reception sound signal generated by the sound receiving apparatus; transmitting, using the communication device, the second sound signal to the remote apparatus; and controlling the processing parameters such that numerical values of the processing parameters in a state where musical sound is included in at least one of the first sound or the second sound differ from numerical values of the processing parameters in a state where no musical sound is included in the at least one of the first sound or the second sound.

A sound processing method according to another aspect of this disclosure is a computer-implemented sound processing method between a remote apparatus and a sound processing system, which includes a communication device, a sound receiving apparatus, and a sound emitting apparatus, that communicate with each other via a network, the method including: receiving, using the communication device, from the remote apparatus, a first sound signal representing first sound generated by a user of the remote apparatus; emitting, using the sound emitting apparatus, the first sound represented by the first sound signal; receiving, using the sound receiving apparatus, sound that includes second sound generated by a user of the sound processing system; generating a second sound signal by sound processing, using processing parameters, a reception sound signal generated by the sound receiving apparatus; transmitting, using the communication device, the second sound signal to the remote apparatus; updating the processing parameters based on the first sound signal or the reception sound signal; and setting a first update cycle and a second update cycle that differs from the first update cycle for updating the processing parameters, in which: the first update cycle is set in a state where musical sound is included in at least one of the first sound or the second sound; and the second update cycle is set in a state where no musical sound is included in the at least one of the first sound or the second sound.

A sound processing method according to another aspect of this disclosure is a computer-implemented sound processing method between a remote apparatus and a sound processing system, which includes a communication device, a sound receiving apparatus, and a sound emitting apparatus, that communicate with each other via a network, the method including: receiving, using the communication device, from the remote apparatus, a first sound signal representing first sound generated by a user of the remote apparatus; emitting, using the sound emitting apparatus, the first sound represented by the first sound signal; receiving, using the sound receiving apparatus, sound that includes second sound generated by a user of the sound processing system; generating a second sound signal by sound processing, using processing parameters, a reception sound signal generated by the sound receiving apparatus; transmitting, using the communication device, the second sound signal to the remote apparatus; updating the processing parameters based on the first sound signal or the reception sound signal; and setting the processing parameters to a first degree of change and a second degree of change that differs from the first degree of change, in which: the first degree of change is set in a state where musical sound is included in at least one of the first sound or the second sound; and the second degree of change is set in a state where no musical sound is included at least one of the first sound or the second sound.

A sound processing system according to another aspect of this disclosure is a sound processing system for communicating with a remote apparatus via a network, the sound processing system including: a communication device configured to receive, from the remote apparatus, a first sound signal representing a first sound generated by a user of the remote apparatus; a sound emitting apparatus configured to emit the first sound represented by the first sound signal; a sound receiving apparatus configured to receive sound that includes second sound generated by a user of the sound communication apparatus; at least one memory storing a program; and at least one processor that implements the program to: generate a second sound signal by sound processing, using processing parameters, a reception sound signal generated by the sound receiving apparatus; transmit, using the communication device, the second sound signal to the remote apparatus; update the processing parameters based on the first sound signal or the reception sound signal; and stop the updating of the processing parameters in a state where musical sound is included in at least one of the first sound or the second sound.

A sound processing system according to another aspect of this disclosure is a sound processing system for communicating with a remote apparatus via a network, the sound processing system including: a communication device configured to receive, from the remote apparatus, a first sound signal representing a first sound generated by a user of the remote apparatus; a sound emitting apparatus configured to emit the first sound represented by the first sound signal; a sound receiving apparatus configured to receive sound that includes second sound generated by a user of the sound processing system; at least one memory storing a program; and at least one processor that implements the program to: generate a second sound signal by sound processing, using processing parameters, a reception sound signal generated by the sound receiving apparatus; transmit, using the communication device, the second sound signal to the remote apparatus; update the processing parameters based on the first sound signal or the reception sound signal; and set a first update cycle and a second update cycle that differs from the first update cycle for updating the processing parameters, in which: the first update cycle is set in a state where musical sound is included in at least one of the first sound or the second sound; and the second update cycle is set in a state where no musical sound is included in the at least one of the first sound or the second sound.

A sound processing system according to another aspect of this disclosure is a sound processing system for communicating with a remote apparatus via a network, the sound communication apparatus including: a communication device configured to receive, from the remote apparatus, a first sound signal representing a first sound generated by a user of the remote apparatus; a sound emitting apparatus configured to emit the first sound represented by the first sound signal; a sound receiving apparatus configured to receive sound that includes second sound generated by a user of the sound processing system; at least one memory storing a program; and at least one processor that implements the program to: generate a second sound signal by sound processing, using processing parameters, a reception sound signal generated by the sound receiving apparatus; transmit, using the communication device, the second sound signal to the remote apparatus; update the processing parameters based on the first sound signal or the reception sound signal; and set the processing parameters to a first degree of change and a second degree of change that differs from the first degree of change, in which: the first degree of change is set in a state where musical sound is included in at least one of the first sound or the second sound; and the second degree of change is set in a state where no musical sound is included at least one of the first sound or the second sound.

BRIEF DESCRIPTION OF THE DRAWINGS

FIG. 7 is a diagram showing procedures of an operation controller.

FIG. 8 is a flow chart showing an example of control procedures.

FIG. 11 is a diagram showing procedures of an operation controller in the second embodiment.

FIG. 12 is a flow chart showing control procedures in the second embodiment.

DESCRIPTION OF THE EMBODIMENTS

A: First Embodiment

Figure 1:
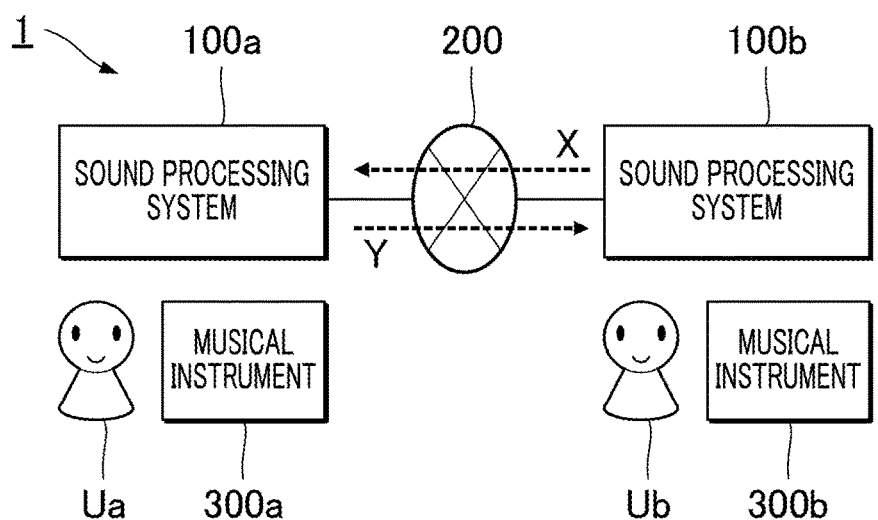
FIG. 1 is a block diagram showing an example of a configuration of a communication system according to a first embodiment.

FIG. 1 is a block diagram showing an example of a configuration of a communication system 1 according to a first embodiment. The communication system 1 is a computer system used in teaching music and includes a sound processing system 100a and a sound processing system 100b. The sound processing systems 100a and 100b are implemented by mobile phones, smart phones, tablets, or personal computers. Speakerphones may be used for the sound processing systems 100a and 100b. The sound processing systems 100a and 100b communicate with each other via a network 200, such as the Internet. The method of communication between the two can be freely selected. The communication path between the sound processing systems 100a and 100b may in part be constituted of radio.

The sound processing system 100a is used by a user Ua who plays a musical instrument 300a, and the sound processing system 100b is used by a user Ub who plays a musical instrument 300b. The user Ua is a music instructor, and the user Ub is a student of the user Ua. The sound processing system 100a and the musical instrument 300a are installed in a space in which the user Ua is located (e.g., a music room). The sound processing system 100b and the musical instrument 300b are installed in a space in which the user Ub is located (e.g., residence of the user Ub). The musical instruments 300a and 300b include, as examples, an electronic musical instrument (e.g., musical keyboard), a stringed instrument and a wind instrument. A variant of teacher student designations described above is one where the user Ub is a music instructor, and the user Ua is a student.

The user Ua plays the musical instrument 300a, and talks to the user Ub over the sound processing system 100a. In one example, the user Ua provides voice instruction to the user Ub while demonstrating an example of playing. In an example given below, speaking a voice sound and playing the musical instrument 300a by the user Ua are executed in different time periods along a time axis. In one example, the user Ub plays the musical instrument 300b, and talks to the user Ua over the sound processing system 100b. In another example, the user Ub practices the musical instrument 300b while talking to the user Ua. In an example given below, speaking a voice sound and playing the musical instrument 300b by the user Ub are executed in different time periods along the time axis.

The sound processing system 100b transmits a sound signal X to the sound processing system 100a. The sound signal X represents sound in the vicinity of the sound processing system 100b. Specifically, the sound signal X represents a musical sound of the musical instrument 300b played by the user Ub, or a voice sound spoken by the user Ub.

The sound processing system 100a transmits a sound signal Y to the sound processing system 100b. The sound signal Y represents a sound in the vicinity of the sound processing system 100a. Specifically, the sound signal Y represents a musical sound of the musical instrument 300a played by the user Ua, or a voice sound spoken by the user Ua.

Examples of a musical sound include a sound played on the musical instrument 300a or 300b, as well as a singing voice of the user Ua or the user Ub. Examples of "playing" include playing the musical instrument 300a or 300b, as well as singing by the user Ua or the user Ub. A spoken voice sound is a speech sound uttered by a human.

The sound processing system 100a emits to the user Ua a sound represented by the sound signal X. The user Ua plays the musical instrument 300a or speaks to the user Ub, while listening to a musical sound of the musical instrument 300b or a spoken voice sound of the user Ub. The sound processing system 100b emits to the user Ub a sound represented by the sound signal Y. The user Ub plays the musical instrument 300b or speaks to the user Ua, while listening to a musical sound of the musical instrument 300a or a spoken voice sound of the user Ua.

Figure 2:
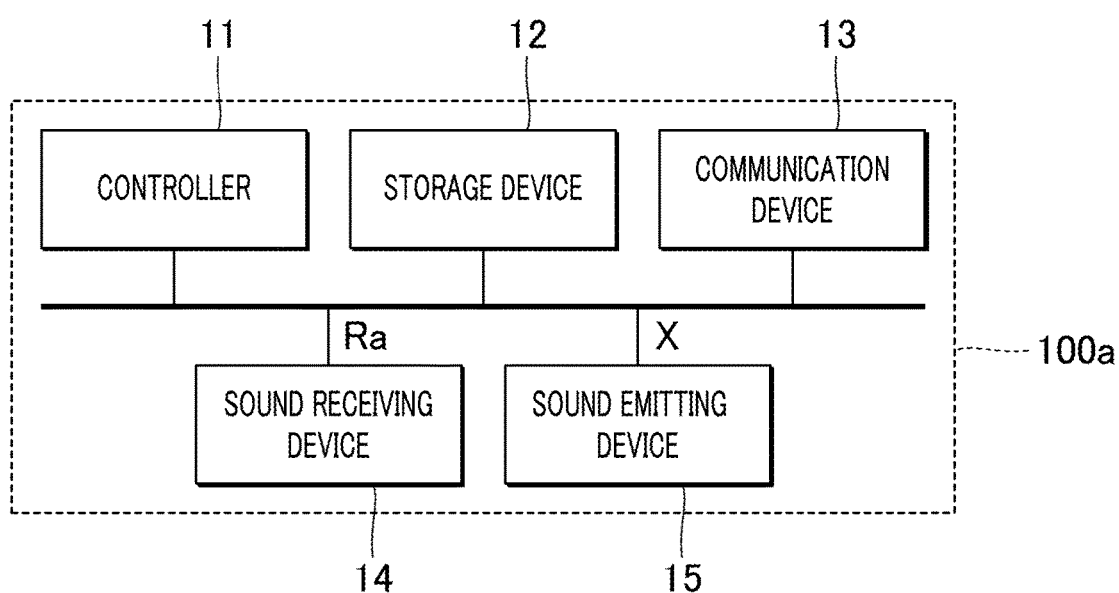
FIG. 2 is a block diagram showing an example of a configuration of a sound processing system.

FIG. 2 is a block diagram showing an example of a specific configuration of the sound processing system 100a. The sound processing system 100b is identical to that of the sound processing system 100a, and thus description of the sound processing system 100b is omitted. As viewed from the sound processing system 100a, the sound processing system 100b is a "far-end apparatus (remote apparatus)."

The sound processing system 100a includes a controller 11, a storage device 12, a communication device 13, a sound receiving device 14, and a sound emitting device 15. The sound processing system 100a may be implemented by a single device, or may be implemented by more than one independent device.

The controller 11 comprises one or more processors that control components of the sound processing system 100a. Specifically, the controller 11 is constituted of one or more processors, such as a Central Processing Unit (CPU), a Sound Processing Unit (SPU), a Digital Signal Processor (DSP), a Field Programmable Gate Array (FPGA), or an Application Specific Integrated Circuit (ASIC).

The storage device 12 comprises one or memory that stores a program executed by the controller 11 and a variety types of data used by the controller 11. The storage device 12 may be constituted of a known recording medium, such as a magnetic recording medium or a semiconductor recording medium, or it may be constituted of a combination of more than one type of recording media. Any recording medium, such as a portable recording medium that is attachable to or detachable from the sound processing system 100a, or a cloud storage that is accessible by the controller 11 via the network 200, may be used as the storage device 12.

The communication device 13 communicates with the sound processing system 100b via the network 200. Specifically, the communication device 13 receives a sound signal X from the sound processing system 100b, and transmits a sound signal Y to the sound processing system 100b. The sound signal X is an example of a "first sound signal", and the sound signal Y is an example of a "second sound signal."

The sound emitting device 15 is a loudspeaker and emits a sound representative of a sound signal X received by the communication device 13 from the sound processing system 100b (hereinafter, a "far-end sound"). From the sound emitting device 15, a musical sound of the musical instrument 300b or a spoken voice sound of the user Ub is emitted as a far-end sound. Thus, a far-end sound is comprehensively expressed as a sound produced by the user Ub. Examples of the far-end sound include a musical sound played on the musical instrument 300b by the user Ub, a singing voice sound of the user Ub (an example of a musical sound), and a spoken voice sound of the user Ub. For convenience of explanation, description of a D/A converter used for a digital sound signal X is omitted. The sound emitting device 15 may be connected to the independent sound processing system 100a either by wire or wirelessly.

The sound receiving device 14 is a microphone and generates a reception sound signal Ra by receiving sound in its vicinity. The sound receiving device 14 may be connected to the independent sound processing system 100a either by wire or wirelessly.

The sound receiving device 14 receives a sound produced by the user Ua who is a near-end user (hereinafter, a "near-end sound"). A near-end sound is a musical sound of the musical instrument 300a or a spoken voice sound of the user Ua. Thus, the near-end sound is a sound generated by the user Ua. Examples of the near-end sound include a musical sound played on the musical instrument 300a by the user Ua, a singing voice sound of the user Ua (an example of a musical sound), and a spoken voice sound of the user Ua. The near-end sound refers to a sound to be transmitted from the sound processing system 100a to the sound processing system 100b. In the first embodiment, emission of a far-end sound by the sound emitting device 15 and reception of a near-end sound by the sound receiving device 14 are executed in parallel.

Figure 3:
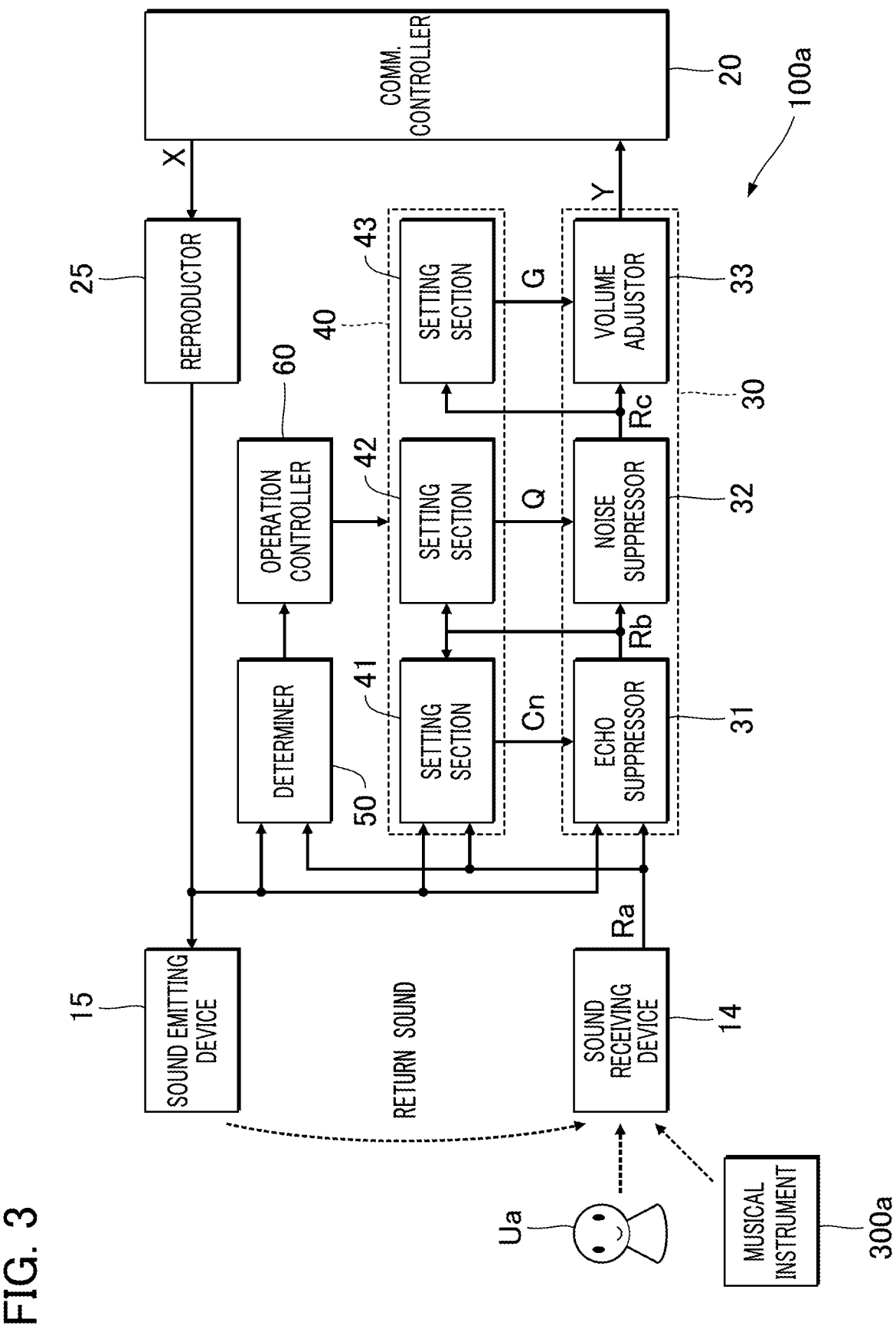
FIG. 3 is a block diagram showing an example of a functional configuration of the sound processing system.

As shown in FIG. 3 described below, sounds other than a near-end sound, for example, a return sound, reach the sound receiving device 14 from the sound emitting device 15. Here, a return sound is a sound generated by reflection of sound emitted from the sound emitting device 15 from walls of the space. Alternatively, a return sound may be a sound that is directly received by the sound receiving device 14 from the sound emitting device 15. Furthermore, noise present in the space may reach the sound receiving device 14. Such noise may be background environmental noise, such as that produced by operation of air conditioning equipment. Thus, although a reception sound signal Ra dominates acoustic components of the near-end sound, sound components other than the near-end sound may be present.

FIG. 3 is a block diagram showing an example of a functional configuration of the sound processing system 100a.

The controller 11 of the sound processing system 100a executes a program stored in the storage device 12 to provide more than one function including a communication controller 20, a reproductor 25, a sound processor 30, an updater 40, a determiner 50, and an operation controller 60.

The communication controller 20 receives a sound signal X transmitted from the sound processing system 100b via the communication device 13. The reproductor 25 applies signal processing, such as equalizing, to the sound signal X received by the communication controller 20. The sound signal X output from the reproductor 25 is supplied to the sound emitting device 15, and thereby a spoken voice sound of the user Ub or a musical sound of the musical instrument 300b is emitted as a far-end sound.

The sound processor 30 applies sound processing to a reception sound signal Ra generated by the sound receiving device 14, to generate a sound signal Y. The communication controller 20 transmits the generated sound signal Y to the sound processing system 100b (i.e., remote apparatus) via the communication device 13. In the first embodiment, the sound processor 30 includes an echo suppressor 31, a noise suppressor 32, and a volume adjustor 33.

The echo suppressor 31 applies echo suppression to the reception sound signal Ra, to generate a reception sound signal Rb. The term "echo suppression" refers to Adaptive Echo Canceller (AEC) by which a return sound (i.e., echo) included in the reception sound signal Ra is suppressed. By use of echo suppression, a reception sound signal Rb is generated, in which a near-end sound included in the reception sound signal Ra is emphasized.

Figure 4:
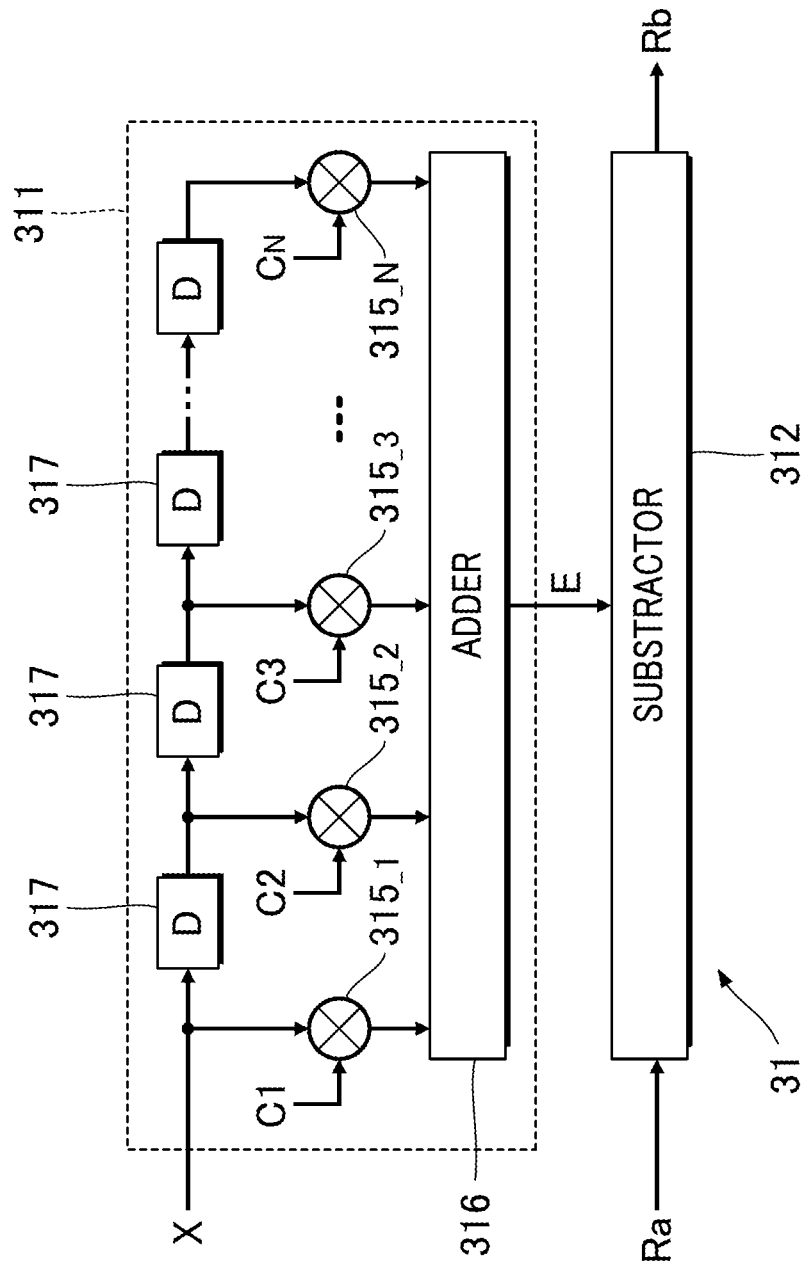
FIG. 4 is a block diagram showing an example of a specific configuration of an echo suppressor.

FIG. 4 is a block diagram showing an example of a specific configuration of the echo suppressor 31. In the first embodiment, the echo suppressor 31 includes an adaptive filter 311 and a subtractor 312. The adaptive filter 311 generates a pseudo echo signal E using the sound signal X. The pseudo echo signal E is a sound signal that approximates the return sound from the sound emitting device 15 to the sound receiving device 14. The subtractor 312 subtracts the pseudo echo signal E from the reception sound signal Ra to generate a reception sound signal Rb. Thus, the echo suppression executed by the echo suppressor 31 includes adaptive filtering by which a pseudo echo signal E is generated using the sound signal X, and subtracting the pseudo echo signal E from the reception sound signal Ra.

In the first embodiment, the adaptive filter 311 is a Finite Impulse Response (FIR) filter that includes a plurality of N adjustors 315_1 to 315_N, and an adder 316. The n-th (n=1 to N) adjustor 315-n receives a sound signal X that is delayed by the (n-1) delays 317 and adjusts the volume level of the sound signal X based on a coefficient Cn. Specifically, the adjustor 315-n is a multiplier that multiplies the sound signal X by the coefficient Cn. The adder 316 adds sound signals X to each other, which have been adjusted by the respective N adjustors 315_1 to 315_N, to generate a pseudo echo signal E. The N coefficients C1 to CN are controlled based on the reception sound signal Rb such that the pseudo echo signal E approximates the return sound. The specific configuration of the adaptive filter 311 is not limited to the example shown in FIG. 4. As long as the response property changes depending on the N coefficients C1 to CN by the adaptive filtering, the configuration of the adaptive filter 311 can be freely selected. The coefficient Cn is an example of a "first coefficient."

As shown in FIG. 3, the noise suppressor 32 applies noise suppression to the reception sound signal Rb to generate a reception sound signal Rc. By the noise suppression, noise components included in the reception sound signal Rb are suppressed. Such noise components that exist in a background is, for example, noise caused by operation of air conditioning equipment. Specifically, the noise suppression is a Spectral Subtraction (SS) by which a frequency spectrum (hereinafter, a "noise spectrum") Q of the noise components is subtracted from a frequency spectrum of the reception sound signal Rb in the frequency domain. The noise suppression includes frequency analysis by which a frequency spectrum of the reception sound signal Rb is calculated, subtraction of a noise spectrum Q from the frequency spectrum, and waveform synthesis by which the frequency spectrum obtained by subtracting is converted into a time-domain reception sound signal Rc. The noise spectrum Q is one parameter of a set of parameters described below, and represents noise components included in the reception sound signal Rb.

As shown in FIG. 3, the volume adjustor 33 applies volume adjustment to the reception sound signal Rc to generate a sound signal Y. The volume adjustment is Auto Gain Control (AGC) by which the reception sound signal Rc is amplified depending on a gain G that corresponds to the volume level of the reception sound signal Rc.

As will be clear from the description, in the first embodiment, the sound processing executed by the sound processor 30 includes echo suppression, noise suppression, and volume adjustment. The set of processing parameters is used in the sound processing. In the first embodiment, the set of processing parameter include a plurality of N coefficients C1 to CN used in the echo suppression, a noise spectrum Q used in the noise suppression, and a gain G used in the volume adjustment. The order of each processing executed in the sound processing is not limited to such an example. The order of the noise suppression and the volume adjustment may be reversed.

The updater 40 updates the set of processing parameters used in the sound processing by the sound processor 30, based on a sound signal X or reception sound signals R (Ra to Rc). The update of the set of processing parameters is repeated at a predetermined cycle. In the first embodiment, the updater 40 includes a setting section 41, a setting section 42, and a setting section 43.

The setting section 41 updates the N coefficients C1 to CN used in the echo suppression. Specifically, the setting section 41 repeats update of each of the N coefficients C1 to CN based on the sound signal X, the reception sound signals Ra and Rb such that the pseudo echo signal E approximates the return sound.

The setting section 42 repeats update of a noise spectrum Q used in the noise suppression based on the reception sound signal Rb. Specifically, the setting section 42 estimates, as a noise spectrum Q, a frequency spectrum of the reception sound signal Rb. The reception sound signal Rb is a signal within a period of time in which the near-end sound and the far-end sound are silent. The noise spectrum Q may be updated by the setting section 42 based on the reception sound signal Ra.

The setting section 43 repeats update of the gain G used in the volume adjustment based on the volume level of the sound represented by the reception sound signal Rc. Specifically, the setting section 43 sets the gain G to a smaller numerical value, as the volume level of the reception sound signal Rc is greater. The gain G may be updated by the setting section 43 based on the volume level of the sound represented by the reception sound signal Ra or Rb.

As shown in FIG. 3, the determiner 50 analyses whether any sound is output from each of the users Ua and Ub. Specifically, the determiner 50 determines whether (1) the far-end sound represented by the sound signal X is silent, or (2) whether the far-end sound includes a musical sound, or (3) whether the far-end sound includes a spoken voice sound. The same determination is applied to the near-end sound represented by the reception sound signal R (Ra, Rb, or Rc).

(1) The expression "the near-end sound is silent" means that the volume of the near-end sound is below a predetermined threshold.
(2) The expression "the near-end sound includes a musical sound" means that the near-end sound includes a musical sound, but does not include a spoken voice sound. Alternatively, the meaning may be that the near-end sound includes both the musical sound and the spoken voice sound, but the volume of the musical sound exceeds that of the spoken voice sound.
(3) The expression "the near-end sound includes a spoken voice sound" means that the near-end sound includes a spoken voice sound, but does not include a musical sound. Alternatively, the meaning may be the near-end sound includes both the spoken voice sound and the musical sound, but the volume of the spoken voice sound exceeds that of the musical sound.

Although description is given here of a near-end sound, the same principals apply to a far-end sound. When a volume of a musical sound is equal to that of a spoken voice sound related to a far-end sound or a near-end sound, the determiner 50 determines that the far-end sound or the near-end sound includes a musical sound.

The determiner 50 analyses a sound signal X to determine types of the far-end sound (silent, musical sound, or spoken voice sound). Furthermore, the determiner 50 analyses any of the reception sound signals Ra, Rb, and Rc to determine a type of the near-end sound (silent, musical sound, or spoken voice sound). Not all of the reception sound signals Ra, Rb, and Rc need be used to determine a near-end sound that corresponds to a reception sound signal. It is sufficient to determine a type of a near-end sound by using any one of these reception signals.

Figure 5:
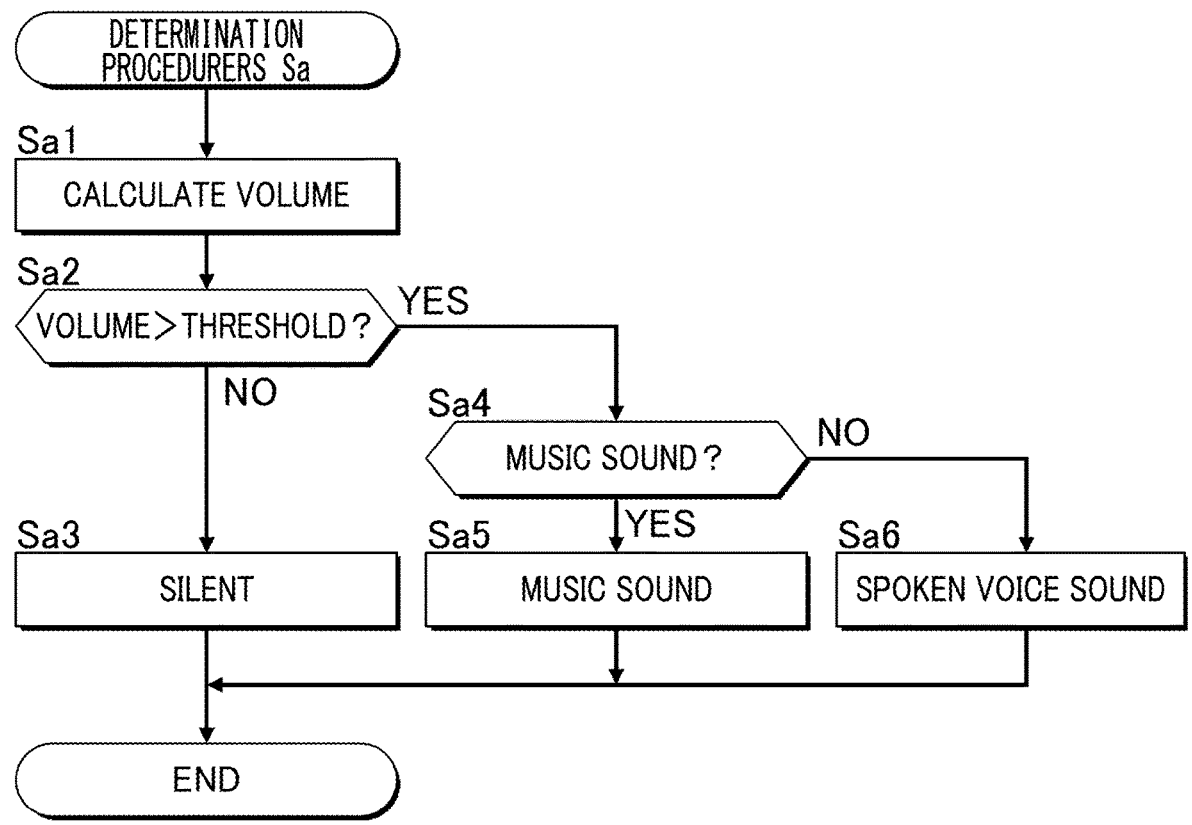
FIG. 5 is a flow chart showing an example of determination procedures.

FIG. 5 is a flow chart showing an example of determination procedures Sa, which are executed by the determiner 50. The determination procedures Sa are repeated at a predetermined cycle. In the description shown in FIG. 5, an example is given of the determination procedures Sa related to a near end sound represented by a reception sound signal R (Ra, Rb, or Rc). The determination procedures Sa are applied to a far-end sound represented by a sound signal X.

Upon start of the determination procedures Sa, the determiner 50 calculates the volume of a near-end sound represented by a reception sound signal R (Sa1), and determines whether the volume exceeds the predetermined threshold (Sa2). When the volume of the near-end sound is below the threshold (Sa2: NO), the determiner 50 sets determination data related to the near-end sound to a numerical value representative of silent (Sa3). The determination data related to the near-end sound represents the result of the determination by the determiner 50, and is stored in the storage device 12. The same procedure is applied to determination data related to a far-end sound described below.

In one example, the threshold used in the determination of silent is determined by an experimental or statistical method such that (i) the threshold exceeds the volume of background environmental noise (e.g., noise caused by operation of air conditioning equipment), and (ii) the threshold is below the volume of a significant musical sound or spoken voice sound. Thus, the expression "the near-end sound or the far-end sound is silent" includes a state in which no noise is present in addition to a state in which noise is present.

When the volume of the near-end sound exceeds the threshold (Sa2: YES), the determiner 50 determines whether the near-end sound includes a musical sound (Sa4). When the near-end sound includes a musical sound (Sa4: YES), the determiner 50 sets determination data related to the near-end sound to a numerical value representative of the musical sound (Sa5). In contrast, when the near-end sound does not include a musical sound (Sa4: NO), the determiner 50 sets the determination data related to the near-end sound to a numerical value representative of a spoken voice sound (Sa6). Thus, when the volume of the near-end sound exceeds the threshold and when the near-end sound does not include a musical sound, it is determined that the near-end sound includes a spoken voice sound.

The determination procedures Sa shown in FIG. 5 are executed in a manner similar for a far-end sound represented by a sound signal X. In one example, when the volume of the far-end sound is below the threshold (Sa2: NO), determination data related to the far-end sound is set to a numerical value representative of silent (Sa3). When the far-end sound includes a musical sound (Sa4: YES), the determination data related to the far-end sound is set to a numerical value representative of a musical sound (Sa5). In contrast, when the far-end sound does not include a musical sound (Sa4: NO), the determination data is set to a numerical value representative of a spoken voice sound (Sa6).

Figure 6:
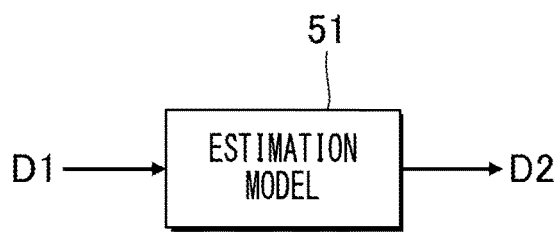
FIG. 6 is a diagram of an estimation model used by a determiner.

The determination executed by the determiner 50, specifically, determination of whether either a musical sound or a spoken voice sound is included in the near-end sound, is implemented by the estimation model 51 shown in FIG. 6. The estimation model 51 is a statistical estimation model that generates output data D2 using input data D1. More specifically, the estimation model 51 is a deep neural network that learns relationships between input data D1 and output data D2. A type of the deep neural network can be freely selected. For example, a Convolutional Neural Network (CNN) or a Recursive Neural Network (RNN) is used as the estimation model 51.

The input data D1 depends on a sound signal X or a reception sound signal R. Specifically, the input data D1 represents a feature amount relating to sound properties of the far-end sound represented by the sound signal X or the near-end sound represented by the reception sound signal R, and the input data D1 is supplied to the estimation model 51. One example of the feature amount is a Mel-Frequency Cepstrum Coefficients (MFCC) representative of characteristics of tones. However, the input data D1 may represent a frequency spectrum calculated based on the sound signal X or the reception sound signal R, and the input data D1 may be supplied to the estimation model 51. Alternatively, the input data D1 may represent a time series of samples constituting the sound signal X or the reception sound signal R, and the input data D1 may be supplied to the estimation model 51. The output data D2 is used to specify either a musical sound or a spoken voice sound. The output data D2 may represent a probability that a near-end sound will correspond to a musical sound and a probability that the near-end sound will correspond to a spoken voice sound, and the output data D2 may be output from the estimation model 51.

The estimation model 51 is implemented by a program that causes the controller 11 to calculate output data D2 relative to input data D1, and variables (e.g., weights and biases) used in such calculations. The variables defining the estimation model 51 are set by supervised machine learning using pieces of training data. Each of the pieces of training data consists of a combination of known input data D1 and known output data D2. The machine learning of the estimation model 51 repeatedly updates the variables of the estimation model 51 such that an error is reduced between (i) output data D2 acquired by inputting input data D1 of each of the pieces of training data to a provisional estimation model 51 and (ii) output data D2 related to the corresponding training data. As a result, by use of the estimation model 51, statistically appropriate output data D2 relative to unknown input data D1 is output under a potential tendency between input data D1 used in each of the pieces of training data and output data D2.

The determiner 50 supplies input data D1 depending on the sound signal X to the estimation model 51, to generate output data D2 that represents whether the far-end sound represented by the sound signal X corresponds to a musical sound or to a spoken voice sound. Furthermore, the determiner 50 supplies input data D1 that depends on the reception sound signal R (e.g., Ra) to the estimation model 51, to generate output data D2 that represents whether the near-end sound represented by the reception sound signal R corresponds to a musical sound or to a spoken voice sound.

The method for determining whether each of the near-end sound and the far-end sound includes a musical sound or a spoken voice sound is not limited to this example. For example, the determiner 50 may compare the feature amount of the reception sound signal R (e.g., Ra) to each of the feature amounts of the musical sound and the spoken voice sounds. As a result, the determiner 50 may determine which of the two feature amounts is similar to the near-end sound for inclusion in the near-end sound. In a manner similar to the reception sound signal R, the determiner 50 may compare the feature amount of the sound signal X to each of the feature amounts of the musical sound and the spoken voice sound. As a result, the determiner 50 may determine which of the two feature amounts is similar to the far-end sound for inclusion in the far-end sound. Furthermore, the estimation model 51 is not limited to the deep neural network. A statistical estimation model, such as a Hidden Markov Model (HMM) or a Support Vector Machine (SVM) may be used as the estimation model 51.

As shown in FIG. 3, the operation controller 60 controls update of the set of processing parameters executed by the updater 40. More specifically, the operation controller 60 controls the updater 40 (the setting sections 41 to 43) based on the result of the determination acquired by the determiner 50. In the first embodiment, based on the result of the determination, the setting sections 41 to 43 control whether update of the set of processing parameters is repeated or stopped under control of the operation controller 60. The operation controller 60 reads the result of the determination by the determiner 50 from the determination data related to the near-end sound and the far-end sound stored in the storage device 12.

FIG. 7 is a diagram showing procedures of the operation controller 60 in the first embodiment. Shown in FIG. 7 are relationships between the result of the determination and update of the set of processing parameters.

State A1 shows that both a near-end sound and a far-end sound are silent. A noise spectrum Q is updated by the setting section 42. Furthermore, in State A1, update of each coefficient Cn is stopped by the setting section 41, and update of the gain G is stopped by the setting section 43. A reception sound signal Ra in State A1 predominantly includes background noise, such as noise caused by operation of air conditioning equipment. As a result of these procedures, the noise spectrum Q in State A1 is updated, and the noise spectrum Q in which noise is reflected with high accuracy is generated.

State A2 shows that the near-end sound is silent and the far-end sound includes a spoken voice sound. Each coefficient Cn is updated by the setting section 41. Furthermore, in State A2, update of the noise spectrum Q is stopped by the setting section 42, and update of the gain G is stopped by the setting section 43. As a result of these procedures, a pseudo echo signal E that approximates the return sound with high accuracy is generated.

State A4 shows that the near-end sound includes a spoken voice sound and the far-end sound is silent. The gain G is updated by the setting section 43. Furthermore, in State A4, update of each coefficient Cn is stopped by the setting section 41, and update of the noise spectrum Q is stopped by the setting section 42. As a result of these procedures, the gain G is updated to a numerical value that enables the volume of the spoken voice sound of the user Ua of the sound processing system 100a to be adjusted appropriately.

States A3, and A6 to A9 show that one of or both the near-end sound and the far-end sound include a musical sound. State A5 shows that both include a spoken voice sound. In such states, update of each coefficient Cn is stopped by the setting section 41, update of the noise spectrum Q is stopped by the setting section 42, and update of the gain G is stopped by the setting section 43. That is, update of all parameters of the set of processing parameters is stopped. Thus, in a time period during which the update is stopped, the lastly updated (current) set of processing parameters is maintained and used in the sound processing.

FIG. 8 is a flow chart showing an example of control procedures Sb, which are implemented by the operation controller 60 to control the updater 40. In one example, the control procedures Sb are started in response to an interrupt generated at a predetermined cycle.

Upon start of the control procedures Sb, the operation controller 60 determines whether the current state corresponds to State A1 (i.e., both the near-end sound and far-end sound are silent) (Sb11). When the current state corresponds to State A1 (Sb11: YES), under control of the operation controller 60, the setting section 42 updates the noise spectrum Q, the setting section 41 stops update of each coefficient Cn, and the setting section 43 stops update of the gain G (Sb12).

When the current state does not correspond to State A1 (Sb11: NO), the operation controller 60 determines whether the current state corresponds to State A2 (i.e., the near-end sound is silent and the far-end sound includes a spoken voice sound) (Sb13). When the current state corresponds to State A2 (Sb13: YES), the setting section 41 updates each coefficient Cn, the setting section 42 stops update of the noise spectrum Q, and setting section 43 stops update of the gain G (Sb14).

When the current state does not correspond to State A2 (Sb13: NO), the operation controller 60 determines whether the current state corresponds to State A4 (i.e., the near-end sound includes a spoken voice sound, and the far-end sound is silent) (Sb15). When the current state corresponds to State A4 (Sb15: YES), the setting section 43 updates the gain G, the setting section 41 stops update of each coefficient Cn, and the setting section 42 stops update of the noise spectrum Q (Sb16).

The case in which the current state does not correspond to State A4 means that the current state is any of States A3, A6 to A9 (i.e., one of or both the near-end sound and the far-end sound include a musical sound), or State A5 (i.e., both includes a spoken voice sound). When the current state does not correspond to State A4 (Sb15: NO), the setting section 41 stops update of each coefficient Cn, the setting section 42 stops update of the noise spectrum Q, and the setting section 43 stops update of the gain G (Sb17). Thus, when at least one of the near-end sound and the far-end sound includes a musical sound, update of the set of processing parameters is stopped by the updater 40.

In the first embodiment, as described above, when a musical sound is included in at least one of the near-end sound and the far-end sound, update of the set of processing parameters is stopped. As a result, application of inappropriate sound processing to reception sound signals Ra, Rb, and Rc is avoided. The effects of the first embodiment will be described below in detail.

In States A7 to A9 (i.e., the near-end sound includes a musical sound), fluctuation of the set of processing parameters may cause change in properties of the musical sound. For example, sound processing may deprecate expression (e.g., intonation) imparted to musical performance by the user Ua (i.e., music instructor). To avoid such deprecation, in the first embodiment, update of the set of processing parameters is stopped in States A7 to A9 (i.e., the near-end sound includes a musical sound). As a result, expression imparted to musical performance by the user Ua is less likely to be deprecated. That is, expression imparted to the musical performance by the user Ua can be accurately conveyed to the user Ub.

In contrast, when only the far-end sound includes a musical sound (the near-end sound does not include a musical sound), a change in the set of the processing parameters does not result in deprecation of expression imparted to musical performance in a near-end sound. However, in the first embodiment, for the following reasons, even when only the far-end sound includes a musical sound, update of the set of processing parameters is stopped.

Each coefficient Cn of the adaptive filter 311 is updated in a condition in which a sound signal X and a reception sound signal Ra are not correlated with each other. Accordingly, in this case, it is difficult to update each coefficient Cn such that a pseudo echo signal E can be estimated with high accuracy. In contrast, when both the near-end sound and the far-end sound include a musical sound, it is likely that the users Ua and Ub are playing together the same piece of music. Examples of such a situation include a situation in which the users Ua and Ub play together different parts of one piece of music, and a situation in which they play together the same parts. When the users Ua and Ub are playing together the same piece of music, the far-end sound (a musical sound of the musical instrument 300b of the user Ub) and the near-end sound (a musical sound of the musical instrument 300a of the user Ua) are in musical harmony with each other. Therefore, the sound signal X and the reception sound signal Ra are correlated with each other. Thus, in State A9 (i.e., both the near-end sound and far-end sound include a musical sound), update of the set of processing parameters (in particular, each coefficient Cn) should be stopped.

When a far-end sound is included in the musical sound, the musical sound is returned from the sound emitting device 15 to the sound receiving device 14, whereby a musical sound corresponding to the far-end sound is included in the reception sound signal Ra. In this embodiment, the sound signal X and the reception sound signal R are analyzed by the determiner 50, and therefore it can be determined with high accuracy that a musical sound is included in one of or both the near-end sound and the far-end sound. However, it is difficult to determine with high accuracy States A3, and A6 to A8 (i.e., one of the near-end sound and the far-end sound includes a musical sound, but the other does not). In fact, it is difficult to identify with high accuracy whether the near-end sound or the far-end sound includes a musical sound (States A3 and A6 to A8 are distinguished from State A9). Accordingly, in the first embodiment, in addition to State A9 (i.e., both the near-end sound and the far-end sound include a musical sound), even in State A3, and A6 to A8 (i.e., one includes a musical sound), update of the set of processing parameters is stopped. As a result, the set of processing parameters is less likely to be updated to an inappropriate numerical value due to the correlation between the near-end sound and the far-end sound.

B: Second Embodiment

The second embodiment will now be described.
In the embodiments described below, like reference signs are used for elements that have functions or effects the same as those of elements described in the first embodiment, and detailed explanation of such elements is omitted as appropriate.

Figure 9:
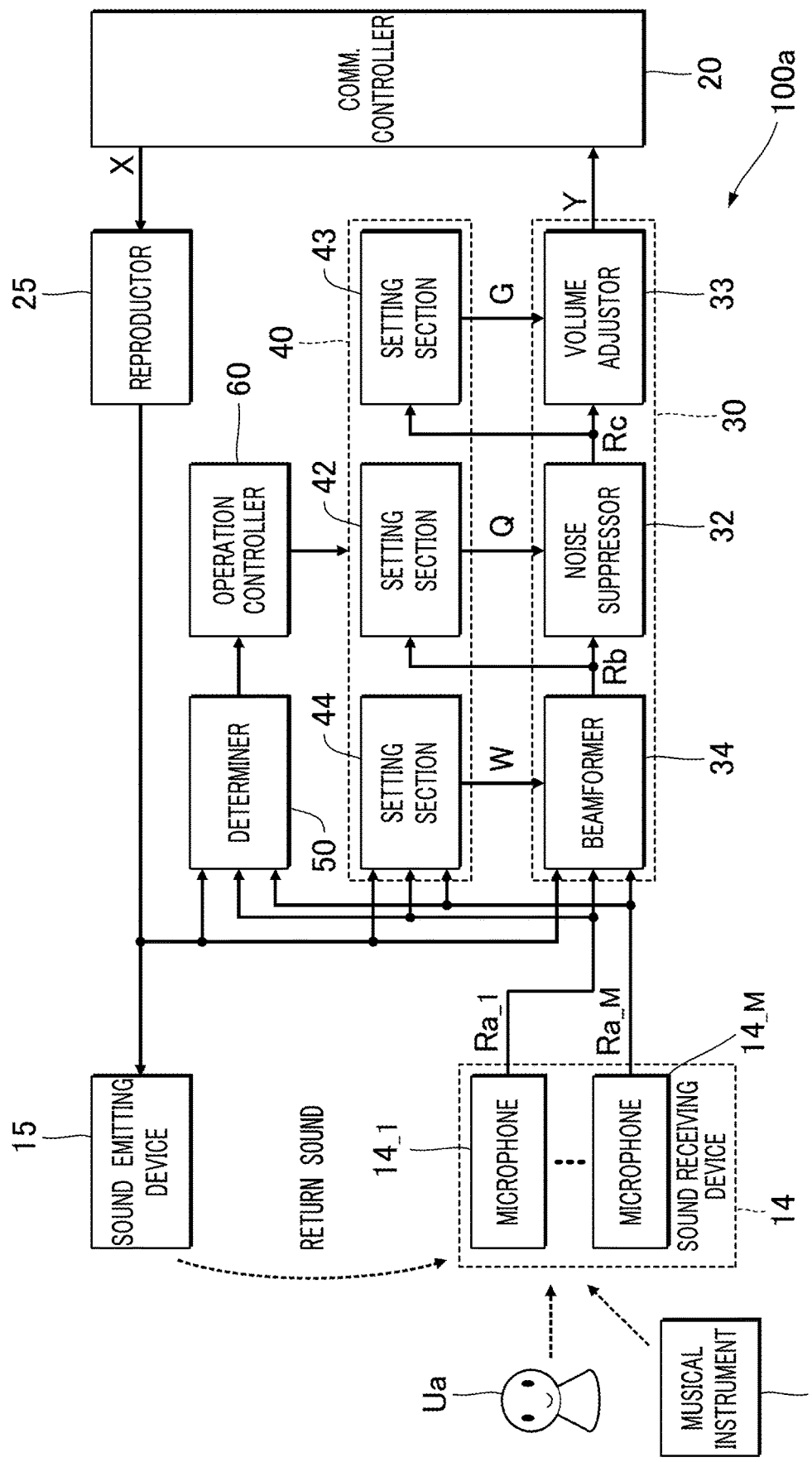
FIG. 9 is a block diagram showing a functional configuration of a sound processing system in a second embodiment.

FIG. 9 is a block diagram showing a functional configuration of a sound processing system 100a in the second embodiment. In the second embodiment, the sound receiving device 14 is a microphone array including microphones 14_1 to 14_M. The M microphones 14_1 to 14_M are arranged in a straight line or a matrix at intervals spaced from each other. The m-th (m=1 to M) microphone 14_m receives sound in their vicinities to generate a reception sound signal Ra_m. Specifically, each microphone 14_m receives, as a near-end sound, a musical sound of the musical instrument 300a or a spoken voice sound of the user Ua.

In the second embodiment, the echo suppressor 31 of the sound processor 30 according to the first embodiment is replaced with a beamformer 34. The configurations and procedures of the remaining elements of the sound processor 30: the noise suppressor 32 and the volume adjustor 33, are the same as those in the first embodiment. Furthermore, in the second embodiment, the setting section 41 of the updater 40 according to the first embodiment is replaced with a setting section 44. The configurations and procedures of the remaining elements of the updater 40: the setting sections 42 and 43, are the same as those in the first embodiment.

As shown in FIG. 9, the beamformer 34 applies beamforming to reception sound signals Ra_1 to Qa_M of the M system generated by the microphones 14_1 to 14_M, to generate a reception sound signal Rb. The beamforming acts as filtering applied to coefficients W. The coefficients W are an example of "second coefficients."

The beamforming includes forming a directivity beam in a direction of arrival of the near-end sound. A localized area with high reception sensitivity of sound corresponds to the beam. That is, the beamformer 34 directs the beam toward the musical instrument 300a or the user Ua, to generate a reception sound signal Rb in which a musical sound of the musical instrument 300a or a spoken voice sound of the user Ua is emphasized. In the second embodiment, the beamforming further includes forming a blind spot in a direction of arrival of the far-end sound. In the blind spot, reception sensitivity of sound is low. Specifically, the blind spot is formed by the beamformer 34 in the direction of the sound emitting device 15, to generate a reception sound signal Rb in which a return sound reaching the sound receiving device 14 from the sound emitting device 15 is suppressed.

The setting section 44 of the updater 40 updates the coefficients W used in the beamforming. Specifically, the setting section 44 repeats update of the coefficients W such that the beam is generated in a direction of arrival of the near-end sound, and the blind spot is generated in a direction of the far end sound. The coefficients W used in the beamforming are updated under a condition in which the sound signal X and the reception sound signal Ra are not correlated with each other.

Figure 10:
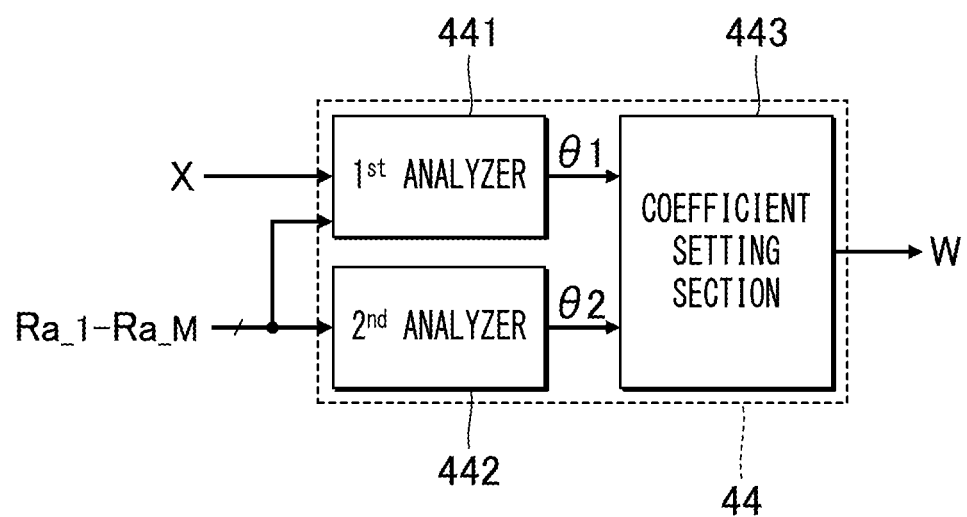
FIG. 10 is a block diagram showing a configuration of a setting section in the second embodiment.

FIG. 10 is a block diagram showing a specific configuration of the setting section 44. The setting section 44 includes a first analyzer 441 and a second analyzer 442, and a coefficient setting section 443. The first analyzer 441 analyses a sound signal X representative of a far-end sound and reception sound signals Ra_1 to Qa_M of the M system representative of the near-end sound, to estimate a direction θ1 of arrival of the far-end sound (i.e., a direction of the sound emitting device 15 that is the sound source of the far-end sound). The second analyzer 442 analyses the reception sound signals Ra_1 to Qa_M of the M system representative of the near-end sound, to estimate a direction θ2 of arrival of the near-end sound. The estimation of the directions θ1 and θ2 are repeated. Specifically, update of the direction θ1 is repeated by the first analyzer 441, and update of the direction θ2 is repeated by the second analyzer 442. The coefficient setting section 443 sets coefficients W based on the estimated direction θ1 and the estimated direction θ2. Thus, the coefficient setting section 443 sets the coefficients W such that the blind spot is formed in the direction θ1 of the far-end sound, and the beam is formed in the direction θ2 of the near-end sound.

FIG. 11 is a diagram showing an example of procedures of the operation controller 60 in the second embodiment. Shown in FIG. 11 are the relationships between the result of the determination by the determiner 50 and update of the set of processing parameters executed by the updater 40.

State B1 shows that both a-near-end sound and a far-end sound are silent. In a manner similar to State A1 according to the first embodiment, the setting section 42 updates a noise spectrum Q. Furthermore, in State B1, the setting section 44 stops update of each coefficient W, and the setting section 43 stops update of the gain G. As a result, a noise spectrum Q representative of background environmental noise, such as noise caused by operation of air conditioning equipment, can be estimated with high accuracy.

State B2 shows that the near-end sound is silent and the far-end sound includes a spoken voice sound. The first analyzer 441 updates the direction θ1 of arrival of the far-end sound. Furthermore, in State B2, the second analyzer 422 stops update of the direction θ2, the setting section 42 stops update of the noise spectrum Q, and the setting section 43 stops update of the gain G. By these procedures, the direction θ1 of arrival of the far-end sound can be estimated with high accuracy. The coefficients W are also updated together with update of the direction θ1.

State B4 shows that the near-end sound includes a spoken voice sound and the far-end sound is silent. Yhe second analyzer 442 updates the direction θ2, and the setting section 43 updates the gain G. Furthermore, in State B4, the setting section 42 stops update of the noise spectrum Q. By use of these procedures, the direction θ2 of arrival of the near-end sound can be estimated with high accuracy. The coefficients W are updated together with update of the direction θ2. In addition, the gain G is updated to a numerical value that enables a volume of the spoken voice sound of the near-end user Ua who speaks over the sound processing system 100a to be adjusted appropriately.

In States B3 and B6 to B9 (i.e., one of or both the near-end sound and the far-end sound include a musical sound), and in State B5 (i.e., both include a spoken voice sound), the first analyzer 441 stops update of the direction θ1, and the second analyzer 442 stops update of the direction θ2. That is, update of the coefficients W is stopped. Furthermore, in States B3 and B5 to B9, the setting section 42 stops update of the noise spectrum Q, and the setting section 43 stops update of the gain G. That is, update of all of the set of processing parameters is stopped. Thus, in a period of time during which the update is stopped, the lastly updated (current) set of processing parameters is maintained and is used in the sound processing.

FIG. 12 is a flow chart showing a specific control procedures Sb in the second embodiment. For example, the control procedures Sb are started in response to an interrupt generated in a predetermined cycle.

Upon the start of the control procedures Sb, the operation controller 60 determines whether the current state corresponds to State B1 (i.e., both a near-end sound and a far-end sound are silent) (Sb21). If state B1 (Sb21: YES), the setting section 42 updates the noise spectrum Q, the first analyzer 441 stops update of the direction θ1, the second analyzer 442 stops update of the direction θ2, and the setting section 43 stops update of the gain G (Sb22).

When the current state does not correspond to State B1 (Sb21: NO), the operation controller 60 determines whether the current state corresponds to State B2 (i.e, the near-end sound is silent, and the far-end sound includes a spoken voice sound) (Sb23). When the current state corresponds to State B2 (Sb23: YES), the first analyzer 441 updates the direction θ1 of arrival of the far-end sound, the second analyzer 442 stops update of the direction θ2, the setting section 42 stops update of the noise spectrum Q, and the setting section 43 stops update of the gain G (Sb24). The coefficients W are updated together with update of the direction θ1.

When the current state does not correspond to State B2 (Sb23: NO), the operation controller 60 determines whether the current state corresponds to State B4 (i.e., the near-end sound includes a spoken voice sound, and the far-end sound is silent) (Sb25). When the current state corresponds to State B4 (Sb25: YES), the second analyzer 442 updates the direction θ2, and the setting section 43 updates the gain G. In addition, the first analyzer 441 stops update of the direction θ1, and the setting section 42 stops update of the noise spectrum Q (Sb26). The coefficients W are updated together with update of the direction θ2 by the second analyzer. In addition, the gain G is updated to a numerical value that enables the volume of the spoken voice sound of the user Ua who speaks over the sound processing system 100a to be adjusted appropriately.

The case in which the current state does not correspond to State B4 shows any of States B3, and B6 to B9 (i.e., one of or both the near-end sound and the far-end sound include a musical sound), or shows State B5 (i.e., both the near-end sound and the far-end sound include a spoken voice sound). When the current state does not correspond to State B4 (Sb25: NO), the first analyzer 441 stops update of the direction θ1, the second analyzer 442 stops update of the direction θ2, the setting section 42 stops update of the noise spectrum Q, and the setting section 43 stops update of the gain G (Sb27). As a result, update of the coefficients W is stopped. Thus, when at least one of the near-end sound and the far-end sound includes a musical sound, update of the set of processing parameters is stopped.

In the second embodiment, when at least one of the near-end sound and the far-end sound includes a musical sound, update of the set of processing parameters is stopped. As a result, in a manner similar to the first embodiment, application of inappropriate sound processing to reception sound signals R (Ra, Rb, and Rc) is minimized.

C: Third Embodiment

Figure 13:
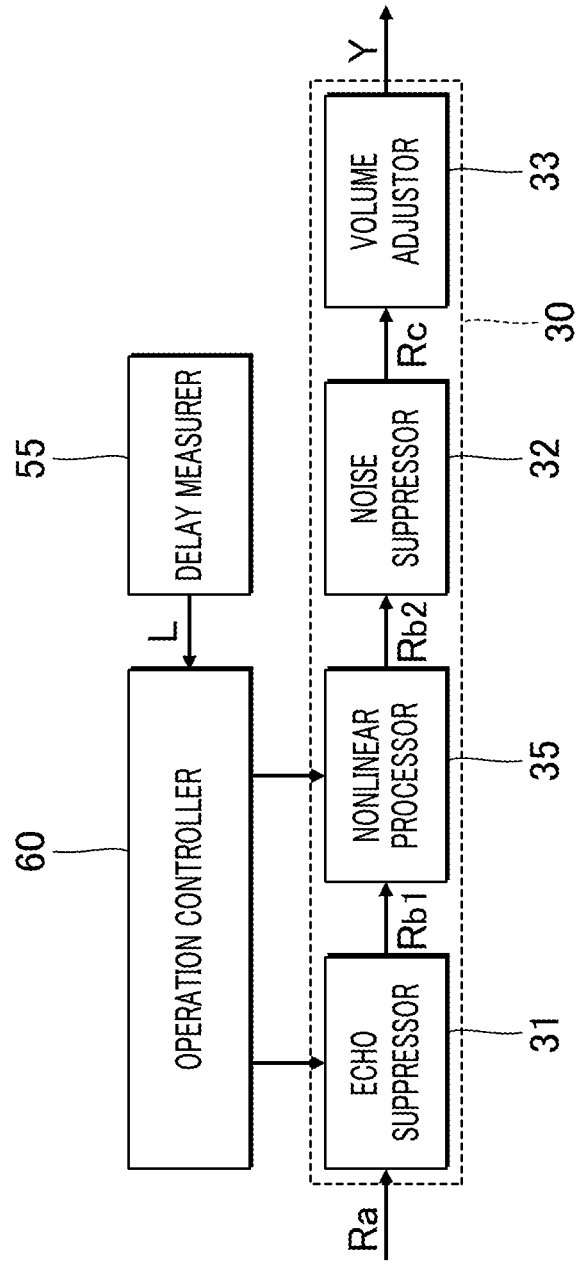
FIG. 13 is a block diagram showing a configuration of a sound processor in a third embodiment.

FIG. 13 is a block diagram showing a configuration of a sound processor 30 in the third embodiment. In the third embodiment, the sound processor 30 includes a nonlinear processor 35 in addition to the same elements as those in the first embodiment (an echo suppressor 31, a noise suppressor 32 and a volume adjustor 33).

The nonlinear processor 35 applies nonlinear processing to a reception sound signal Rb1 acquired from the echo suppressor 31 (corresponding to a reception sound signal Rb in the first embodiment), to generate a reception sound signal Rb2. By the nonlinear processing, frequency masking, which comprises gains corresponding to different frequency bands on the frequency axis, is multiplied by the frequency spectrum of the reception sound signal Rb1. The frequency masking is repeatedly updated depending on the acoustic properties of the reception sound signal Rb1. Specifically, the frequency masking is a binary masking. The gain of each frequency band in which a return sound remains within frequency bands is set to a first value (e.g., 0). The gain of each remaining frequency band is set to a second value (e.g., 1), which is greater than the first value. Thus, acoustic components of the return sound remaining within the reception sound signal Rb1 after the echo suppression are reduced by the nonlinear processing. The configurations and procedures of the noise suppressor 32 and the volume adjustor 33 are the same as those in the first embodiment.

The order of the nonlinear processing, the noise suppression and the volume adjustment is freely selected, and it is not limited to the example shown in FIG. 13.

In the third embodiment, the controller 11 of the sound processing system 100a executes the program stored in the storage device 12, thereby implementing a delay measurer 55 in addition to the elements similar to those in the first embodiment (a communication controller 20, a reproductor 25, a sound processor 30, an updater 40, a determiner 50, and an operation controller 60). The delay measurer 55 measures a communication delay L between the sound processing systems 100a and 100b. The communication delay L represents a duration required for one of the sound processing systems 100a and 100b to receive a signal transmitted from the other. Known techniques may be employed for measurement of the communication delay L.

In the third embodiment, the operation controller 60 controls the sound processor 30 based on the communication delay L. Specifically, a response speed Z1 and a response speed Z2 are controlled based on the communication delay L. The response speed Z1 represents a speed at which the N coefficients C1 to CN used by the adaptive filter 311 are interlocked with changes in a sound signal X and a reception sound signal R (Ra, Rb or Rc). Specifically, as the response speed Z1 increases, the N coefficients C1 to CN are updated to closely follow changes in the acoustic properties of the sound signal X and the reception sound signal R. The response speed Z2 represents a speed at which the frequency masking used in the nonlinear processing is interlocked with a change in a reception sound signal Rb1. Specifically, as the response speed Z2 increases, the frequency masking is updated to closely follow changes in the acoustic properties of the reception sound signal Rb1.

When the communication delay L is small, a return sound, which reaches the sound receiving device 14 from the sound emitting device 15, tends not to be problematic for the user Ub in listening to the near-end sound. Accordingly, the operation controller 60 lowers the response speeds Z1 and Z2 when the communication delay L decreases. Thus, when the communication delay L is small, changes over time in the N coefficients C1 to CN and the frequency masking are suppressed. Specifically, changes in each coefficient Cn and the frequency masking relative to changes in the acoustic properties of the sound signal X or the reception sound signal Rb1 are suppressed.

When the communication delay L is large, the return sound tends to be apparent. Accordingly, the operation controller 60 increases the response speeds Z1 and Z2 as the communication delay L increases. Thus, when the communication delay L is large, each coefficient Cn and the frequency masking rapidly change to closely follow changes in the acoustic properties of the sound signal X or the reception sound signal Rb1.

In the third embodiment, the response speed Z1 of the N coefficients C1 to CN used in the adaptive filter 311 is controlled based on the communication delay L. As a result, a preferred echo suppression can be applied to a reception sound signal Ra to reduce the return sound received by the sound receiving device 14. Furthermore, the response speed Z2 of the frequency masking used in the nonlinear processing is controlled based on the communication delay L. As a result, a preferred nonlinear process can be applied to a reception sound signal Rb1 to reduce the return sound received by the sound receiving device 14.

Although an example is given of an embodiment including an echo suppressor 31 based on the first embodiment shown in FIG. 3, the third embodiment is applied to the second embodiment including a beamformer 34.

D: Modifications

Specific modifications applicable to each of the aspects described above are set out below. Two or more modes selected from the following descriptions may be combined with one another as appropriate as long as such combination does not give rise to any conflict.

(1) The specific configuration of the sound processor 30 is not limited to the foregoing embodiments. One of, or some of the following included in the sound processor 30 according to each embodiment may be omitted: an echo suppressor 31, a noise suppressor 32, a volume adjustor 33, a beamformer 34, and a nonlinear processor 35.

(2) In the foregoing embodiments, update of the set of processing parameters is stopped when a musical sound is included in at least one of a near-end sound and a far-end sound. However, the update need not necessarily be executed when a cycle of update of the set of processing parameters is controlled. In this case, the operation controller 60 controls an update cycle of the set of processing parameters (hereinafter, "update cycle") based on a presence or absence of a musical sound. The phrase "update cycle" refers to a number of updates of the set of processing parameters per unit time. The update cycle may be a period of time between two updates. In the foregoing embodiments, when a musical sound is included in at least one of the near-end sound and the far-end sound, the update cycle of the set of processing parameters is zero.

Instead of the update cycle, a degree of change of the set of processing parameters upon each update executed by the updater 40 may be used. In one example, the numerical value of the set of processing parameters to be updated next Pnext is calculated by Equation (1) as follows:

$$Pnext = (1-\alpha) \cdot Pold + \alpha \cdot Pnow \ldots \quad (1)$$

The equation (1) represents an exponential moving average, and depends on a latest (current) set of processing parameters, Pnow and a past (or immediately prior) set of processing parameters, Pold. The parameters to be used may be the coefficients C1 to CN, or the noise spectrum Q, or the gain G, or some or all of these. Here, a coefficient $\alpha$ is set to a non-negative numerical value of 1 or less ($0 \leq \alpha \leq 1$).

As the coefficient $\alpha$ becomes greater, the relative influence of the latest set of processing parameters, Pnow, on the set of processing parameters to be updated next, Pnext, increases. In contrast, as the coefficient $\alpha$ becomes smaller, the relative influence of the past set of processing parameters, Pold, on the set of processing parameters to be updated next, Pnext, decreases. That is, as the coefficient $\alpha$ becomes greater, the set of processing parameters to be updated next, Pnext, more closely follows change in a sound signal X or a reception sound signal R (Ra, Rb, or Rc). Thus, the parameter a represents a degree of change in the set of processing parameters relative to change in the sound signal X or the reception sound signal R.

The operation controller 60 sets a first update cycle (or a first degree of change in the set of processing parameters) and a second update cycle that differs from the first update cycle (or a second degree of change in the set of processing parameters). The first update cycle is a cycle in a case in which a musical sound is included in at least one of a near-end sound and a far-end sound. The second update cycle is a cycle given in a case in which no musical sound is included. For example, the operation controller 60 sets the first update cycle (or the first degree of change) (e.g., coefficient $\alpha$) to a numerical value smaller than the second update cycle (or the second degree of change). Thus, the operation controller 60 lowers the first update cycle to be less than the second update cycle. Even with such a configuration, compared with a configuration in which the set of processing parameters are updated without distinction of whether a musical sound is included in at least one of a near-end sound and a far-end sound, greater control of the set of processing parameters used in the sound processing can be expected. Instead of the example described above, the first update cycle (or the first degree) and the second update cycle (or the second degree) may be set such that the first update cycle exceeds the second update cycle.

(3) In the first embodiment, an echo suppressor 31 is included in a sound processor 30. In the second embodiment, a beamformer 34 is included in the sound processor 30. However, the sound processor 30 may include both the echo suppressor 31 and the beamformer 34. In this case, plural ones of the echo suppressors 31 may be provided one-to-one for the M microphones 14_1 to 14_M. The beamformer 34 generates a reception sound signal Rb using reception sound signals Ra_1 to Ra_M of the M system generated by the different plural ones of the echo suppressors 31.

(4) In the foregoing embodiments, the sound processing system 100a of the user Ua communicates with the sound processing system 100b of the user Ub. However, the sound processing system 100a may communicate with more than one sound processing system 100b. For example, a case can be assumed in which more than one student (i.e., users Ub) is instructed by one instructor (i.e., a user Ua). In this situation, a sound signal X representative of mixed sounds of musical sounds or spoken voice sounds of the users Ub is received by the communication device 13 of the sound processing system 100a. In such a configuration, in a manner similar to the foregoing embodiments, update of the set of processing parameters used in the sound processing is stopped when both a far-end sound of the sound signal X and a near-end sound of the reception sound signal Ra include a musical sound.

(5) The functions of the sound processing system 100a are implemented by cooperation of one or more processors, which comprise the controller 11, and the program stored in the storage device 12. The program according to the present disclosure may be provided by being pre-recorded on a computer-readable recording medium, and it may be installed in a computer. For example, the recording medium may be a non-transitory recording medium, examples of which include an optical recording medium (optical disk), such as a CD-ROM. The recording medium may be a known recording medium, such as a semiconductor recording medium, or a magnetic recording medium. The non-transitory recording medium includes any recording medium excluding a transitory propagating signal, and a volatile recording medium is not excluded. When programs are distributed by a distribution device via a network, a storage device included in the distribution device corresponds to a non-transient recording medium described above.

F: Appendices

The following configurations are derivable from the foregoing embodiments.

A computer-implemented sound processing method according to an aspect (Aspect 1) of this disclosure includes: receiving, via a communication apparatus from a far-end apparatus, a first sound signal representative of a far-end sound generated by a first user; emitting, using a sound emitting apparatus, the far-end sound represented by the first sound signal; receiving, using a sound receiving apparatus, a sound that includes a near-end sound generated by a second, near-end user; generating a second sound signal by using a set of processing parameters to apply sound processing to a reception sound signal generated by the sound receiving apparatus; transmitting the second sound signal to the far-end apparatus; updating the set of processing parameters based on the first sound signal or the reception sound signal; and stopping update of the set of processing parameters based on a musical sound being included in at least one of the near-end sound and the far-end sound.

In this aspect, update of the set of processing parameters is stopped when at least one of the near-end sound and the far-end sound includes a musical sound. As a result, unsuitable sound processing applied to the reception sound signal is reduced.

The term "far-end sound (first sound)" means a sound generated by the first user, and includes a spoken voice sound and a musical sound. The term "near-end sound (second sound)" means a sound transmitted to the far-end apparatus (remote apparatus), and includes a spoken voice sound or a musical sound generated by the second user. The spoken voice sound is a speech sound uttered by a human. A spoken voice sound includes vocal instruction by an instructor who is instructing one or more students in a music lesson. A musical sound includes a singing voice sound of a user in addition to a sound played on a musical instrument by the user. The term "playing" include playing a musical instrument, as well as singing.

The description "the near-end sound includes a musical sound" refers to cases as follows: (i) the near-end sound includes only a musical sound (does not include a spoken voice sound), and (ii) the near-end sound includes both a spoken voice sound and a musical sound, but the volume of the musical sound exceeds that of the spoken voice sound. The same variations apply to the far-end sound. Specifically, the description "the far-end sound includes a musical sound" refers to cases as follows: (i) the far-end sound includes only a musical sound (does not include a spoken voice sound), and (ii) the far-end sound includes both a spoken voice sound and a musical sound, but the volume of the musical sound exceeds that of the spoken voice sound.

In an example (Aspect 2) according to Aspect 1, the sound processing includes suppressing, in the reception sound signal, a pseudo echo signal that approximates a return sound that reaches the sound receiving apparatus from the sound emitting apparatus.

According to this aspect, effects of a return sound, which reaches the sound receiving apparatus from the sound emitting apparatus, on the second sound signal is reduced, and the second sound signal is transmitted to the far-end apparatus.

In an example (Aspect 3) according to Aspect 2, suppressing the pseudo echo signal includes: adaptive filtering by which the pseudo echo signal is generated using the first sound signal; and subtracting the pseudo echo signal using the reception signal, and the set of processing parameters includes a plurality of first coefficients used in the adaptive filtering.

In this aspect, when at least one of the near-end sound and the far-end sound includes a musical sound, update of the coefficients used in the adaptive filtering is stopped. As a result, the return sound included in the reception sound signal is suppressed appropriately.

In an example (Aspect 4) according to Aspect 3, the plurality of first coefficients are updated based on: the far-end sound including a spoken voice sound; and the near-end sound being silent.

According to this aspect, a pseudo echo signal that approximates a return sound can be generated with high accuracy.

In an example (Aspect 5) according to any one of Aspects 1 to 4, the sound processing includes beamforming that forms a beam directed in a direction of arrival of the near-end sound, and the set of processing parameters includes a plurality of second coefficients used in the beamforming.

In this aspect, when at least one of the near-end sound and the far-end sound includes a musical sound, update of the second coefficients used in the beamforming is stopped. As a result, the return sound included in the reception sound signal is suppressed appropriately.

In an example (Aspect 6) according to Aspect 5, the beamforming includes: analyzing the first sound signal and the reception sound signal to estimate a first direction of arrival of the far-end sound toward the sound receiving apparatus; analyzing the reception sound signal to estimate a second direction of arrival of the near-end sound toward the sound receiving apparatus; and setting the plurality of the second coefficients such that a blind spot is formed in the first direction and the beam is formed in the second direction, the first direction is updated and update of the second direction is stopped, based on: the near-end sound being silent; and the far-end sound including a spoken voice sound, and the second direction is updated and update of the first direction is stopped, based on: the near-end sound including a spoken voice sound; and the far-end sound being silent.

According to this aspect, the near-end sound can be emphasized with high accuracy compared with the far-end sound.

In an example (Aspect 7) according to any one of Aspects 1 to 6, the sound processing includes amplifying the reception sound signal using a gain based on a volume level of the reception sound signal, and the set of processing parameters includes the gain.

According to this aspect, when at least one of the near-end sound and the far-end sound includes a musical sound, update of the gain used in the volume adjustment is stopped. As a result, the volume level of the reception sound signal is adjusted appropriately.

In an example (Aspect 8) according to any one of Aspects 1 to 7, the gain is updated based on: the near-end sound including a spoken voice sound; and the far-end sound being silent.

According to this aspect, the gain is updated such that a volume of the near-end sound is appropriately adjusted.

In an example (Aspect 9) according to any one of Aspects 1 to 8, the sound processing includes suppressing noise components included in the reception sound signal, and the set of processing parameters includes a parameter representative of the noise components.

According to this aspect, when at least one of the near-end sound and the far-end sound includes a musical sound, update of a parameter representative of noise components to be suppressed from the reception sound signal is stopped. As a result, the noise components of the reception sound signal are appropriately suppressed.

In an example (Aspect 10) according to Aspect 9, the parameter representative of the noise components is updated based on both the near-end sound and the far-end sound being silent.

According to this aspect, a parameter representative of noise in the vicinity of the sound receiving apparatus is generated with high accuracy.

In an example (Aspect 11) according to Aspect 1, determining, as a first determination, to which of a plurality of sound types including a musical sound and a spoken voice sound the far-end sound corresponds, based on an analysis of the first sound signal; determining, as a second determination, to which of the plurality of sound types the near-end sound corresponds, based on an analysis of the reception sound signal; and based on the first determination and the second determination, selecting either update of the set of processing parameters or stop of the update thereof.

In an example (Aspect 12) according to Aspect 11, in the first determination, generating first output data representative of which of the sound types the far-end sound corresponds to, using a trained first estimation model with input of a feature amount of the first sound signal; and in the second determination, generating second output data representative of which of the sound types the near-end sound corresponds to, using a trained second estimation model with input of feature amount of the reception sound signal.

According to this aspect, by using the trained estimation model, it is possible to estimate with high accuracy to which of the sound types the far-end sound corresponds.

A computer-implemented sound processing method according to another aspect (Aspect 13) of this disclosure includes: receiving, via a communication apparatus from a far-end apparatus, a first sound signal representative of a far-end sound generated by a first user; emitting, using a sound emitting apparatus, the far-end sound represented by the first sound signal; receiving, using a sound receiving apparatus, a sound that includes a near-end sound generated by a second, near-end user; generating a second sound signal by using a set of processing parameters to apply sound processing to a reception sound signal generated by the sound receiving apparatus; transmitting the second sound signal to the far-end apparatus; updating the set of processing parameters based on the first sound signal or the reception sound signal; and setting a first update cycle and a second update cycle that differs from the first update cycle, in which, the first update cycle is an update cycle in a case in which a musical sound is included in at least one of the near-end sound and the far-end sound, and the second update cycle is an update cycle in a case in which no musical sound is included in at least one of the near-end sound and the far-end sound.

A computer-implemented sound processing method according to another aspect (Aspect 15) of this disclosure includes: receiving, via a communication apparatus from a far-end apparatus, a first sound signal representative of a far-end sound generated by a first user; emitting, using a sound emitting apparatus, the far-end sound represented by the first sound signal; receiving, using a sound receiving apparatus, a sound that includes a near-end sound generated by a second, near-end user; generating a second sound signal by using a set of processing parameters to apply sound processing to a reception sound signal generated by the sound receiving apparatus; transmitting the second sound signal to the far-end apparatus; updating the set of processing parameters based on the first sound signal or the reception sound signal; and setting in the set of processing parameters a first degree of change, and a second degree of change that differs from the first degree of change, in which, the first degree of change is a degree of change in the set of processing parameters in a case in which a musical sound is included in at least one of the near-end sound and the far-end sound, and the second degree of change is a degree of change in the set of processing parameters in a case in which no musical sound is included at least one of the near-end sound and the far-end sound.

According to Aspect 13, the first update cycle differs from the second update cycle. Furthermore, according to Aspect 15, the first degree of change differs from the second degree of change. As a result, inappropriate processing of the reception sound signal is minimized.

Each update cycle refers to a number of updates of the set of processing parameters per unit time. Each degree of change refers to a degree of change of the set of processing parameters for each update.

In an example (Aspect 14) according to Aspect 13, each of the first and second update cycles is a number of updates per unit time, and the first update cycle is lower than the second update cycle.

According to this aspect, inappropriate processing of the reception sound signal is minimized.

In an example (Aspect 16) according to Aspect 15, each of the first and second degrees of change is a degree of how much the set of processing parameters changes for each update thereof, and the first degree of change is lower than the second degree of change.

According to this aspect, inappropriate sound processing of the reception sound signal is minimized.

A sound processing system according to another aspect (Aspect 17) of this disclosure includes: a communication apparatus configured to receive from a far-end apparatus, a first sound signal representative of a far-end sound generated by a first user; a sound emitting apparatus configured to emit the far-end sound represented by the first sound signal; a sound receiving apparatus configured to receive a sound that includes a near-end sound generated by a second, near-end user; at least one memory storing a program; and at least one processor that implements the program to: generate a second sound signal by using a set of processing parameters to apply sound processing to a reception sound signal generated by the sound receiving apparatus; transmit the second sound signal to the far-end apparatus; update the set of processing parameters based on the first sound signal or the reception sound signal; and stop update of the set of processing parameters based on a musical sound being included in at least one of the near-end sound and the far-end sound.

A sound processing system according to another aspect (Aspect 18) of this disclosure includes: a communication apparatus configured to receive from a far-end apparatus, a first sound signal representative of a far-end sound generated by a first user; a sound emitting apparatus configured to emit the far-end sound represented by the first sound signal; a sound receiving apparatus configured to receive a sound that includes a near-end sound generated by a second, near-end user; at least one memory storing a program; and at least one processor that implements the program to: generate a second sound signal by using a set of processing parameters to apply sound processing to a reception sound signal generated by the sound receiving apparatus; transmit the second sound signal to the far-end apparatus; update the set of processing parameters based on the first sound signal or the reception sound signal; and set a first update cycle and a second update cycle that differs from the first update cycle, in which, the first update cycle is an update cycle in a case in which a musical sound is included in at least one of the near-end sound and the far-end sound, and the second update cycle is an update cycle in a case in which no musical sound is included in at least one of the near-end sound and the far-end sound.

A sound processing system according to another aspect (Aspect 19) of this disclosure includes: a communication apparatus configured to receive from a far-end apparatus, a first sound signal representative of a far-end sound generated by a first user; a sound emitting apparatus configured to emit the far-end sound represented by the first sound signal; a sound receiving apparatus configured to receive a sound that includes a near-end sound generated by a second, near-end user; at least one memory storing a program; and at least one processor that implements the program to: generate a second sound signal by using a set of processing parameters to apply sound processing to a reception sound signal generated by the sound receiving apparatus; transmit the second sound signal to the far-end apparatus; update the set of processing parameters based on the first sound signal or the reception sound signal; and setting in the set of processing parameters a first degree of change, and a second degree of change that differs from the first degree of change, in which, the first degree of change is a degree of change in the set of processing parameters in a case in which a musical sound is included in at least one of the near-end sound and the far-end sound, and the second degree of change is a degree of change in the set of processing parameters in a case in which no musical sound is included at least one of the near-end sound and the far-end sound.

A sound processing system according to another aspect (Aspect 20) of this disclosure is a computer-implemented sound processing method between a remote apparatus and a sound processing system, which includes a communication device, a sound receiving apparatus, and a sound emitting apparatus, that communicate with each other via a network, the method including: receiving, using the communication device, from the remote apparatus, a first sound signal representing first sound generated by a user of the remote apparatus; emitting, using the sound emitting apparatus, the first sound represented by the first sound signal; receiving, using the sound receiving apparatus, sound that includes second sound generated by a user of the sound processing system; generating a second sound signal by sound processing, using processing parameters, a reception sound signal generated by the sound receiving apparatus; transmitting, using the communication device, the second sound signal to the remote apparatus; and controlling the processing parameters such that numerical values of the processing parameters in a state where musical sound is included in at least one of the first sound or the second sound differ from numerical values of the processing parameters in a state where no musical sound is included in the at least one of the first sound or the second sound.

DESCRIPTION OF REFERENCES SIGNS

1: communication system, 100a and 100b: sound processing system, 200: network, 300a and 300b: instrument, 11: controller, 12: storage device, 13: communication device, 14: sound receiving device, 15: sound emitting device, 20: communication controller, 25: reproducer, 30: sound processor, 31: echo suppressor, 311: adaptive filter, 312: subtractor, 32: noise suppressor, 33: volume adjustor, 34: beamformer, 35: nonlinear processor, 40: updater, 41 to 44: setting section, 50: determiner, 55: delay measurer, 60: operation controller.

What is claimed is:

1. A computer-implemented sound processing method between a remote apparatus and a sound processing system, which includes a communication device, a sound receiving apparatus, and a sound emitting apparatus, that communicate with each other via a network, the method comprising:
receiving, using the communication device, from the remote apparatus, a first sound signal representing first sound generated by a user of the remote apparatus;
emitting, using the sound emitting apparatus, the first sound represented by the first sound signal;
receiving, using the sound receiving apparatus, sound that includes second sound generated by a user of the sound processing system;
generating a second sound signal by sound processing, using processing parameters, a reception sound signal generated by the sound receiving apparatus;
transmitting, using the communication device, the second sound signal to the remote apparatus;
updating the processing parameters based on the first sound signal or the reception sound signal; and
stopping the updating of the processing parameters in a state where musical sound is included in at least one of the first sound or the second sound.

2. The sound processing method according to claim 1, wherein the sound processing includes suppressing, in the reception sound signal, a pseudo echo signal that approximates a return sound that reaches the sound receiving apparatus from the sound emitting apparatus.

3. The sound processing method according to claim 2, wherein:
the suppressing of the pseudo echo signal includes:
adaptive filtering by which the pseudo echo signal is generated using the first sound signal; and
subtracting the pseudo echo signal using the reception signal, and
the processing parameters include a plurality of first coefficients used in the adaptive filtering.

4. The sound processing method according to claim 3, wherein the updating updates the plurality of first coefficients based on:
the first sound including a spoken voice sound; and
the second sound being silent.

5. The sound processing method according to claim 1, wherein:
the sound processing includes beamforming that forms a beam directed in a direction of arrival of the second sound, and
the processing parameters include a plurality of second coefficients used in the beamforming.

6. The sound processing method according to claim 5, wherein the beamforming includes:
analyzing the first sound signal and the reception sound signal to estimate a first direction of arrival of the first sound toward the sound receiving apparatus;
analyzing the reception sound signal to estimate a second direction of arrival of the second sound toward the sound receiving apparatus; and
setting the plurality of second coefficients so that a blind spot is formed in the first direction and the beam is formed in the second direction, wherein:
the first direction is updated and update of the second direction is stopped, based on:
the second sound being silent; and
the first sound including a spoken voice sound, and
the second direction is updated and the update of the first direction is stopped, based on:

the second sound including a spoken voice sound; and the first sound being silent.

7. The sound processing method according to claim 5, wherein:

the sound processing includes amplifying the reception sound signal using a gain based on a volume level of the reception sound signal, and the processing parameters include the gain.

8. The sound processing method according to claim 7, wherein the sound processing updates the gain based on:

the second sound including a spoken voice sound; and the first sound being silent.

9. The sound processing method according to claim 1, wherein:

the sound processing includes suppressing noise components included in the reception sound signal, and the processing parameters include a parameter representative of the noise components.

10. The sound processing method according to claim 9, wherein the updating updates the parameter representative of the noise components based on both the first sound and the second sound being silent.

11. The sound processing method according to claim 1, further comprising:

determining, as a first determination, a sound type, from among a plurality of sound types including a musical sound and a spoken voice sound, of the first sound, based on an analysis of the first sound signal;

determining, as a second determination, the sound type of the second sound, based on an analysis of the reception sound signal; and based on the first determination and the second determination, selecting either updating of the processing parameters or stopping of the update thereof.

12. The sound processing method according to claim 11, wherein:

the first determination generates first output data representative of the sound type of the first sound, using a trained first estimation model that inputs a feature amount of the first sound signal; and the second determination generates second output data representative of the sound type of the second sound, using a trained second estimation model that inputs a feature amount of the reception sound signal.

13. A computer-implemented sound processing method between a remote apparatus and a sound processing system, which includes a communication device, a sound receiving apparatus, and a sound emitting apparatus, that communicate with each other via a network, the method comprising:

receiving, using the communication device, from the remote apparatus, a first sound signal representing first sound generated by a user of the remote apparatus;

emitting, using the sound emitting apparatus, the first sound represented by the first sound signal;

receiving, using the sound receiving apparatus, sound that includes second sound generated by a user of the sound processing system;

generating a second sound signal by sound processing, using processing parameters, a reception sound signal generated by the sound receiving apparatus;

transmitting, using the communication device, the second sound signal to the remote apparatus;

updating the processing parameters based on the first sound signal or the reception sound signal; and setting a first update cycle and a second update cycle that differs from the first update cycle for updating the processing parameters, wherein:

the first update cycle is set in a state where musical sound is included in at least one of the first sound or the second sound; and the second update cycle is set in a state where no musical sound is included in the at least one of the first sound or the second sound.

14. The sound processing method according to claim 13, wherein:

each of the first and second update cycles is a number of updates per unit time, and the first update cycle is lower than the second update cycle.

15. A computer-implemented sound processing method between a remote apparatus and a sound processing system, which includes a communication device, a sound receiving apparatus, and a sound emitting apparatus, that communicate with each other via a network, the method comprising:

receiving, using the communication device, from the remote apparatus, a first sound signal representing first sound generated by a user of the remote apparatus;

emitting, using the sound emitting apparatus, the first sound represented by the first sound signal;

receiving, using the sound receiving apparatus, sound that includes second sound generated by a user of the sound processing system;

generating a second sound signal by sound processing, using processing parameters, a reception sound signal generated by the sound receiving apparatus;

transmitting, using the communication device, the second sound signal to the remote apparatus;

updating the processing parameters based on the first sound signal or the reception sound signal; and setting the processing parameters to a first degree of change and a second degree of change that differs from the first degree of change, wherein:

the first degree of change is set in a state where musical sound is included in at least one of the first sound or the second sound; and the second degree of change is set in a state where no musical sound is included in at least one of the first sound or the second sound.

16. The sound processing method according to claim 15, wherein:

each of the first and second degrees of change is a degree of how much the processing parameters change for each update thereof, and the first degree of change is lower than the second degree of change.

17. A sound processing system for communicating with a remote apparatus via a network, the sound processing system comprising:

a communication device configured to receive, from the remote apparatus, a first sound signal representing a first sound generated by a user of the remote apparatus;

a sound emitting apparatus configured to emit the first sound represented by the first sound signal;

a sound receiving apparatus configured to receive sound that includes second sound generated by a user of the sound processing system;

at least one memory storing a program; and at least one processor that implements the program to:

generate a second sound signal by sound processing, using processing parameters, a reception sound signal generated by the sound receiving apparatus;

transmit, using the communication device, the second sound signal to the remote apparatus;
update the processing parameters based on the first sound signal or the reception sound signal; and
stop the updating of the processing parameters in a state where musical sound is included in at least one of the first sound or the second sound.

18. A sound processing system for communicating with a remote apparatus via a network, the sound processing system comprising:
a communication device configured to receive, from the remote apparatus, a first sound signal representing a first sound generated by a user of the remote apparatus;
a sound emitting apparatus configured to emit the first sound represented by the first sound signal;
a sound receiving apparatus configured to receive sound that includes second sound generated by a user of the sound processing system;
at least one memory storing a program; and
at least one processor that implements the program to:
generate a second sound signal by sound processing, using processing parameters, a reception sound signal generated by the sound receiving apparatus;
transmit, using the communication device, the second sound signal to the remote apparatus;
update the processing parameters based on the first sound signal or the reception sound signal; and
set a first update cycle and a second update cycle that differs from the first update cycle for updating the processing parameters, wherein:
the first update cycle is set in a state where musical sound is included in at least one of the first sound or the second sound; and
the second update cycle is set in a state where no musical sound is included in the at least one of the first sound or the second sound.

19. A sound processing system for communicating with a remote apparatus via a network, the sound communication apparatus comprising:
a communication device configured to receive, from the remote apparatus, a first sound signal representing a first sound generated by a user of the remote apparatus;
a sound emitting apparatus configured to emit the first sound represented by the first sound signal;
a sound receiving apparatus configured to receive sound that includes second sound generated by a user of the sound processing system;
at least one memory storing a program; and
at least one processor that implements the program to:
generate a second sound signal by sound processing, using processing parameters, a reception sound signal generated by the sound receiving apparatus;
transmit, using the communication device, the second sound signal to the remote apparatus;
update the processing parameters based on the first sound signal or the reception sound signal; and
set the processing parameters to a first degree of change and a second degree of change that differs from the first degree of change, wherein:
the first degree of change is set in a state where musical sound is included in at least one of the first sound or the second sound; and
the second degree of change is set in a state where no musical sound is included in at least one of the first sound or the second sound.

20. A computer-implemented sound processing method between a remote apparatus and a sound processing system, which includes a communication device, a sound receiving apparatus, and a sound emitting apparatus, that communicate with each other via a network, the method comprising:
receiving, using the communication device, from the remote apparatus, a first sound signal representing first sound generated by a user of the remote apparatus;
emitting, using the sound emitting apparatus, the first sound represented by the first sound signal;
receiving, using the sound receiving apparatus, sound that includes second sound generated by a user of the sound processing system;
generating a second sound signal by sound processing, using processing parameters, a reception sound signal generated by the sound receiving apparatus;
transmitting, using the communication device, the second sound signal to the remote apparatus; and
controlling the processing parameters such that numerical values of the processing parameters in a state where musical sound is included in at least one of the first sound or the second sound differ from numerical values of the processing parameters in a state where no musical sound is included in the at least one of the first sound or the second sound.

* * * * *